(12) United States Patent
  Saitoh

(10) Patent No.: US 9,338,610 B2
(45) Date of Patent: May 10, 2016

(54) FLOW LINE MANAGEMENT APPARATUS, FLOW LINE MANAGEMENT SYSTEM, AND RECORDING MEDIUM

(71) Applicant: Takayuki Saitoh, Kanagawa (JP)

(72) Inventor: Takayuki Saitoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 194 days.

(21) Appl. No.: 14/027,590

(22) Filed: Sep. 16, 2013

(65) Prior Publication Data

US 2014/0080511 A1 Mar. 20, 2014

(30) Foreign Application Priority Data

Sep. 18, 2012 (JP) ................................. 2012-205086
Sep. 4, 2013 (JP) ................................. 2013-183393

(51) Int. Cl.
  *H04W 24/00* (2009.01)
  *H04W 4/04* (2009.01)
(52) U.S. Cl.
  CPC .................................... *H04W 4/043* (2013.01)
(58) Field of Classification Search
  CPC .................................................. H04W 4/043
  USPC ..................................................... 455/456.1
  See application file for complete search history.

(56) References Cited

U.S. PATENT DOCUMENTS

| 8,249,914 B2 | 8/2012 | Umeda |
| 8,280,398 B2 * | 10/2012 | Ishii et al. .................. 455/456.1 |
| 8,650,135 B2 * | 2/2014 | Sankai ............... G06K 9/00335 |
| | | 706/12 |
| 2003/0009364 A1 * | 1/2003 | Miyoshi ............... G06Q 10/063 |
| | | 705/7.11 |

FOREIGN PATENT DOCUMENTS

| JP | 2005-158007 | 6/2005 |
| JP | 2007-049308 | 2/2007 |
| WO | WO 2005/086375 | 9/2005 |

OTHER PUBLICATIONS

U.S. Appl. No. 13/795,383 filed on Mar. 12, 2013.

* cited by examiner

*Primary Examiner* — Amancio Gonzalez
(74) *Attorney, Agent, or Firm* — Oblon, McClelland, Maier & Neustadt, L.L.P.

(57) ABSTRACT

A flow line management apparatus includes a usage information acquisition unit configured to acquire usage information of an apparatus disposed at a predetermined position, a positional information acquisition unit configured to acquire positional information of a wireless terminal held by a user using the apparatus, and a flow line determining unit configured to determine a flow line when the user uses the apparatus based on the usage information acquired by the usage information acquisition unit and the positional information acquired by the positional information acquisition unit.

20 Claims, 16 Drawing Sheets

FIG.10A

| USER IDENTIFICATION INFORMATION (uID) | POSITIONAL INFORMATION | COMMUNICATION DATE AND TIME |
|---|---|---|
| A-2 | N35.66.12, E139.74.56 | 7/5 10:30:40 |
| ... | ... | ... |

FIG.10B

| USER IDENTIFICATION INFORMATION (uID) | POSITIONAL INFORMATION | COMMUNICATION DATE AND TIME |
|---|---|---|
| A-2 | N35.66.12, E139.74.66 | 7/5 10:31:00 |
| A-2 | N35.66.12, E139.74.66 | 7/5 10:32:00 |
| ... | ... | ... |

FIG.10C

| USER IDENTIFICATION INFORMATION (uID) | POSITIONAL INFORMATION | COMMUNICATION DATE AND TIME |
|---|---|---|
| A-1 | N35.65.82, E139.74.66 | 7/5 10:00:10 |
| ... | ... | ... |

FIG.11A

| USER IDENTIFICATION INFORMATION (uID) | POSITIONAL INFORMATION | COMMUNICATION DATE AND TIME |
|---|---|---|
| A-1 | N35.65.82, E139.74.56 | 7/5 10:00:00 |
| A-1 | N35.65.82, E139.74.66 | 7/5 10:00:10 |
| A-1 | N35.65.82, E139.74.76 | 7/5 10:00:20 |
| A-1 | N36.65.92, E139.74.76 | 7/5 10:00:30 |
| A-1 | N36.66.02, E139.74.76 | 7/5 10:00:40 |
| ... | ... | ... |
| A-2 | N35.65.92, E139.74.56 | 7/5 10:30:00 |
| A-2 | N35.66.02, E139.74.56 | 7/5 10:30:20 |
| A-2 | N35.66.12, E139.74.56 | 7/5 10:30:40 |
| A-2 | N35.66.12, E139.74.66 | 7/5 10:31:00 |
| A-2 | N35.66.12, E139.74.76 | 7/5 10:31:20 |
| A-2 | N35.66.12, E139.74.66 | 7/5 10:32:00 |

FIG.11B

| MFP IDENTIFICATION INFORMATION (mfpID) | OPERATING DATE AND TIME | OPERATING CONTENT |
|---|---|---|
| 16-2 | 7/5 10:00:45 | COPY |
| 16-1 | 7/5 10:29:55 | PRINT |
| ... | ... | ... |

FIG.12

| FLOW LINE MANAGEMENT NUMBER | MFP IDENTIFICATION INFORMATION (mfpID) | OPERATING CONTENT | USER IDENTIFICATION INFORMATION (uID) | POSITIONAL INFORMATION | DATE AND TIME |
|---|---|---|---|---|---|
| L1 | 16-2 | COPY | A-1 |  | 7/5 10:00:45 |
|  |  |  |  | N35.65.82, E139.74.56 | 7/5 10:00:00 |
|  |  |  |  | N35.65.82, E139.74.66 | 7/5 10:00:10 |
|  |  |  |  | N35.65.82, E139.74.76 | 7/5 10:00:20 |
|  |  |  |  | N36.65.92, E139.74.76 | 7/5 10:00:30 |
|  |  |  |  | N36.66.02, E139.74.76 | 7/5 10:00:40 |
| L2 | 16-1 | PRINT | A-2 |  | 7/5 10:29:55 |
|  |  |  |  | N35.65.92, E139.74.56 | 7/5 10:30:00 |
|  |  |  |  | N35.66.02, E139.74.56 | 7/5 10:30:20 |
|  |  |  |  | N35.66.12, E139.74.56 | 7/5 10:30:40 |
|  |  |  |  | N35.66.12, E139.74.66 | 7/5 10:31:00 |
|  |  |  |  | N35.66.12, E139.74.76 | 7/5 10:31:20 |
|  |  |  |  | N35.66.12, E139.74.66 | 7/5 10:32:00 |
| ⋮ |  |  |  |  |  |

FLOW LINE MANAGEMENT APPARATUS, FLOW LINE MANAGEMENT SYSTEM, AND RECORDING MEDIUM

BACKGROUND OF THE INVENTION

1. Field of the Invention

The disclosures herein generally relate to a flow line management apparatus, a flow line management system, and a non-transitory computer-readable recording medium storing a flow line management program.

2. Description of the Related Art

The related art technology, such as International Publication Pamphlet No. WO 2005-086375 (Patent Document 1), discloses a system to estimate a position of a terminal based on unique information transmitted from a predetermined disposed position received by the terminal.

However, the related art technology, such as disclosed above, may simply estimate a position of a terminal based on unique information received by the terminal. Hence, the related art technology does not disclose a system or method to detect users' flow lines from respective positions of the users to apparatuses shared by the users within an office based, for example, on information acquired by terminals.

RELATED ART DOCUMENTS

Patent Document

Patent Document 1: International Publication Pamphlet No. WO 2005-086375

SUMMARY OF THE INVENTION

Accordingly, it is a general object in one embodiment of the disclosures to provide a novel and useful flow line management apparatus, a flow line management system, and a non-transitory computer-readable recording medium storing a flow line management program capable of appropriately determining a flow line of a user who utilizes an apparatus.

According to one aspect of the embodiment, there is provided a flow line management apparatus that includes a usage information acquisition unit configured to acquire usage information of an apparatus disposed at a predetermined position; a positional information acquisition unit configured to acquire positional information of a wireless terminal held by a user using the apparatus; and a flow line determining unit configured to determine a flow line when the user uses the apparatus based on the usage information acquired by the usage information acquisition unit and the positional information acquired by the positional information acquisition unit.

The object and advantages of the invention will be realized and attained by means of the elements and combinations particularly pointed out in the claims.

It is to be understood that both the foregoing general description and the following detailed description are exemplary and explanatory and are not restrictive of the invention as claimed.

Other objects and further features of the present invention will be apparent from the following detailed description when read in conjunction with the accompanying drawings.

BRIEF DESCRIPTION OF THE DRAWINGS

FIGS. 10A, 10B, and 10C are diagrams illustrating examples of information sent from the delivery apparatus to the flow line management server;

FIGS. 11A and 11B are diagrams illustrating examples of information acquired by the flow line management server;

FIG. 12 is a diagram illustrating an example of flow line information created by the flow line management server;

DESCRIPTION OF THE PREFERRED EMBODIMENTS

In the following, preferred embodiments of the present invention will be described in details with reference to the accompanying drawings. In the following embodiments, a description is given of an example of a flow line management system utilizing a position management system that manages positional information of objects or persons in a predetermined area of an indoor environment.

First Embodiment
Position Management System: Schematic Configuration

Figure 1:
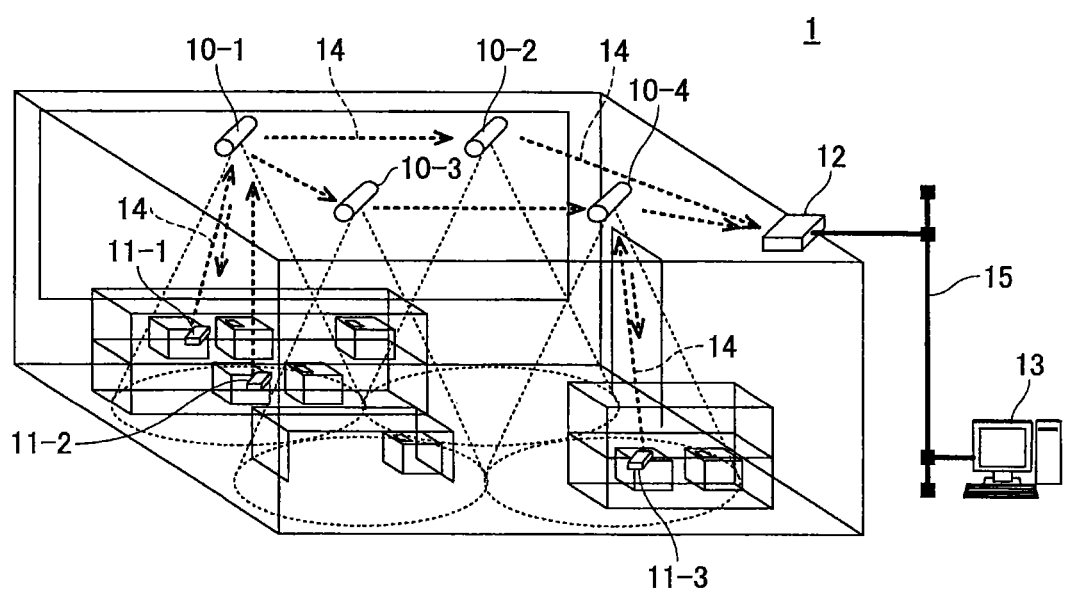
FIG. 1 is a schematic configuration diagram illustrating an example of a position management system according to a first embodiment.

FIG. 1 is a schematic configuration diagram illustrating an example of a position management system according to a first embodiment. As illustrated in FIG. 1, a position management system 1 includes delivery apparatuses 10-1 to 10-4, wireless terminals 11-1 to 11-3, a gateway device 12, and a positional information management system 13. The delivery apparatuses 10-1 to 10-4, the wireless terminals 11-1 to 11-3, and the gateway device 12 are connected via a wireless network 14. The gateway device 12 and the positional information management system 13 are connected via a network 15.

Note that in the following description, wherever appropriate, the delivery apparatuses 10-1 to 10-4 are simply referred to as "delivery apparatus(es) 10", and the wireless terminals 11-1 to 11-3 are simply referred to as "wireless terminal(s) 11".

The delivery apparatus 10 is integrated in a lighting device such as a fluorescent light-emitting diode (LED) disposed, for example, on a ceiling or the like of each floor of a building, and configured to operate by receiving electricity from the lighting device. However, the delivery apparatus 10 is not limited to such an arrangement and a configuration. The delivery apparatus 10 may, for example, have a separate case and be configured to operate by receiving electricity from a power supply disposed in advance.

The delivery apparatuses 10 is configured to consecutively or intermittently deliver its own positional information (e.g., longitude information, latitude information, the number of floors of the building, and building number information) associated with its setting information to a predetermined radio wave range (i.e., an area subject to management) via wireless signals.

Note that the above-described predetermined radio wave range is determined based, for example, on an output transmitted from the delivery apparatus 10, directivity of an antenna, and the like. However, a cone-shaped broken line illustrated beneath each delivery apparatus 10 indicates the predetermined radio wave range of the delivery apparatus 10 in the example of FIG. 1. The delivery apparatus 10 may preferably be disposed, such that the predetermined radio wave range illustrated in FIG. 1 does not overlap a predetermined radio wave range of each of adjacently disposed delivery apparatuses 10, and has no gap between the predetermined radio wave range of the delivery apparatus 10 and the predetermined radio wave ranges of the adjacently disposed delivery apparatuses 10. However, the arrangement and the configuration of the delivery apparatus 10 are not limited to those described above. The delivery apparatus 10 may, for example, be disposed in a desired predetermined area that covers the predetermined radio wave range of the delivery apparatus 10.

Note that when the predetermined radio wave ranges of the delivery apparatus 10 overlaps a predetermined radio wave range of any one of adjacently disposed delivery apparatuses 10, the wireless terminal 11 may, for example, be configured to determine one of the delivery apparatuses based on the received radio field intensity.

The delivery apparatus 10 may, for example, be configured to deliver its own positional information to the wireless terminal 11 by utilizing a wireless communications system selected from an indoor messaging system (IMES), a visible radiation communications system, infrared-ray communications system, and a wireless local area network (LAN) system.

The wireless terminal 11 may receive positional information from one of the delivery apparatuses 10-1 to 10-4 located closest to the wireless terminal 11. The wireless terminal 11 may, for example, be provided with an active tag indicating capability of transmitting its own radio wave. The wireless terminal 11 may, for example, include a function equivalent to that of an active tag. Examples of such a wireless terminal may include a smartphone, a personal digital assistant (PDA), a personal computer (PC), a smartmeter, or the like.

In the example of FIG. 1, the wireless terminal 11 is attached to a storage box or an object that is subject to management; however, the wireless terminal 11 is not limited to being attached to the storage box or the object. For example, the wireless terminal 11 may be embedded in an identity (ID) card or a mobile phone so as to manage a person who has the wireless terminal 11.

When the wireless terminal 11 receives the positional information of the above-described delivery apparatus 10, the wireless terminal 11 transmits the received positional information, its own terminal information (i.e., the terminal ID), or the like to the delivery apparatus 10 via a short-distant wireless communications system such as IEEE 802.15.4 or ZigBee (Registered Trademark). Note that the terminal information of the wireless terminal 11 may, for example, include an abbreviated address of IEEE 802.15.4, an IEEE extended media access control (MAC) address or the like.

Note that the information transmitted from the wireless terminal 11 to the delivery apparatuses 10 is routed within the wireless network 14, based on routing information held by each of the delivery apparatuses, and transmitted to the gateway device 12 via a corresponding one of predetermined delivery apparatus 10. Note that when the gateway device 12 is disposed closer to the wireless terminal 11 than the delivery apparatus 10, the wireless terminal 11 may transmit the above information to the gateway device 12. The transmitting or receiving operation of the wireless terminal 11 may be performed at a predetermined time. Alternatively, when the wireless terminal 11 has an acceleration sensor, the transmitting or receiving operation of the wireless terminal 11 may be performed at a time where the acceleration sensor in the wireless terminal 11 detects a change in the acceleration.

The gateway device 12 may, for example, be disposed on each of the floors of the building or each of the rooms partitioned by walls. The gateway device 12 is configured to receive information (the aforementioned positional information or terminal information) transmitted from the wireless terminal 11 via the delivery apparatus 10. Further, the gateway device 12 is configured to transmit the received information transmitted from the wireless terminal 11 via the delivery apparatus 10 to the positional information management system 13 via the network 15.

The gateway device 12 is mutually connected to the wireless network 14 and the network 15, and the information transmitted from the wireless network 14 side to the network 15. When the wireless network 14 forms a personal area network (PAN) based on the IEEE 802.15.4 standard or the Zigbee specification, and the network 15 forms a local area network (LAN) based on the IEEE 802.3 standard, the gateway device 12 converts a communications system between the wireless network 14 and the network 15.

Note that when the wireless network 14 forms the above-described PAN, the wireless terminal 11, the delivery apparatus 10, and the gateway device 12 are controlled such that each of the wireless terminal 11, the delivery apparatus 10, and the gateway device 12 includes an end device function, a router function, and a coordinator function determined by the Zigbee specification.

The above-described routing information is generated when the wireless terminal 11 and the delivery apparatus 10 may, for example, undergo the control of the gateway device 12 at startup, and form the PAN to determine their respective minimum routes to the gateway device 12.

When the positional information management system 13 receives information transmitted from the wireless terminal 11 via the gateway device 12, the positional information management system 13 records the received information with received date and time of the received information. The positional information management system 13 is configured to manage a position of the wireless terminal 11 based on the received information transmitted from the wireless terminal 11. Note that the positional information management system 13 may integrate the functions of the gateway device 12.

The wireless network 14 may, for example, form PAN based on the IEEE 802.15.4 standard and Zigbee specification; however, the wireless network 14 may alternatively form PAN based on a short-distance wireless communications interfaces such as "Bluetooth (Registered Trademark) LE", "ANT", and "Z-Wave".

The network 15 may, for example, be a local area network (LAN) specified based on the IEEE 802.3 standard; however, the network 15 may include plural types of networks such as the Internet and the like.

Wireless Network 14

Figure 2:
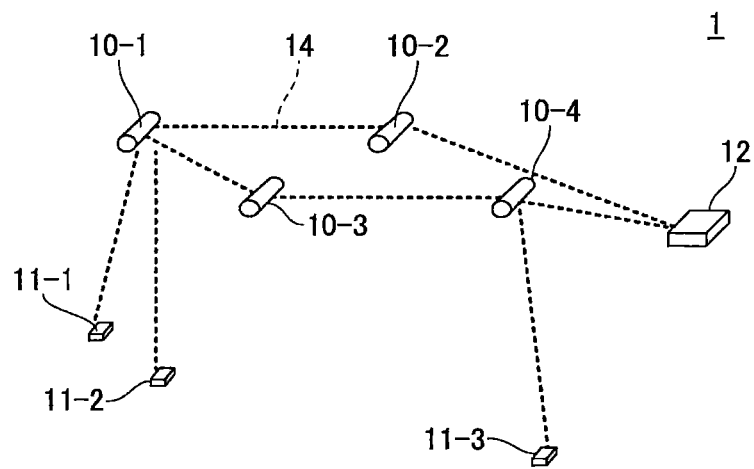
FIG. 2 is a diagram illustrating an example of a network composing a position management system.

FIG. 2 is a diagram illustrating an example of a network composing a position management system. As illustrated in FIG. 2, the position management system 1 illustrated in FIG. 1 includes the delivery apparatuses 10-1 to 10-4, the wireless terminals 11-1 to 11-3, and the gateway device 12 that are mutually connected via the wireless network 14. As illustrated by dotted lines in FIG. 2, information transmitted from wireless terminals 11-1 to 11-2 is received by the delivery apparatus 10-1, and the information received by the delivery apparatus 10-1 is then transmitted to the gateway device 12 via other delivery apparatuses 10-2 to 10-4.

Note that the respective configurations of the delivery apparatus 10 and the wireless terminal 11, and the respective numbers of delivery apparatuses 10 and wireless terminals are not limited to those of the above-described example illustrated in FIGS. 1 and 2.

Flow Line Management System: Schematic Configuration

Figure 3:
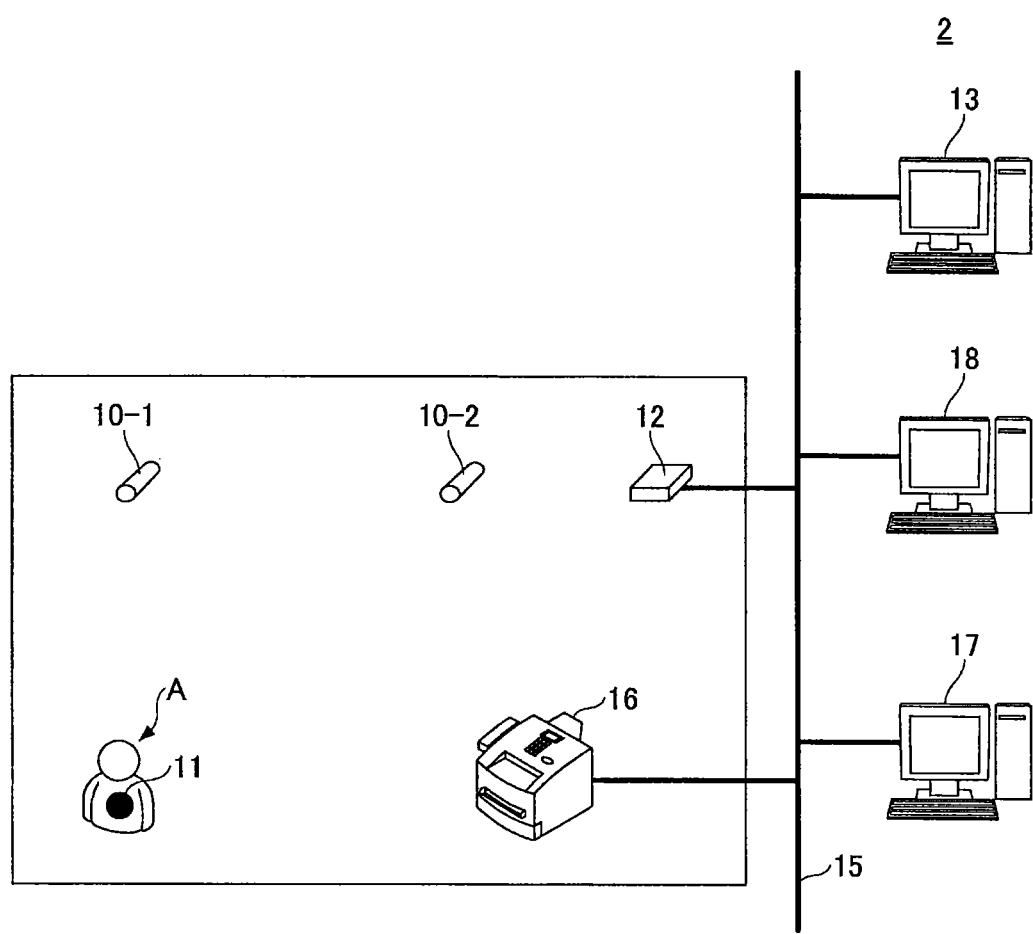
FIG. 3 is a schematic configuration diagram illustrating a flow line management system.

FIG. 3 is a schematic configuration diagram illustrating a flow line management system. As illustrated in FIG. 2, a flow line management system 2 according to the first embodiment includes delivery apparatuses 10-1 to 10-2, a wireless terminal 11, a positional information management system 13, a multifunctional peripheral (MFP) 16 serving as an external apparatus, an apparatus management server 17, and a flow line management server 18 serving as a flow line management apparatus.

Note that in the example of FIG. 3, the apparatus management server 17 and the flow line management server 18 are connected via a network 15. Further, the respective configurations of the delivery apparatus 10, the wireless terminal 11, and the MFP 16, and the respective numbers of the delivery apparatuses 10, the wireless terminals 11, and the MFPs 16 are not limited to those described above.

The wireless terminal 11 may, for example, be incorporated in an ID card or a mobile phone and held by a user A. The wireless terminal 11 may, for example, holds user identification information (e.g., user ID (uID etc.)) as terminal information of the wireless terminal 11. For example, when the user A has moved and the wireless terminal 11 receives positional information from the delivery apparatuses 10-1 to 10-2, and the like, the wireless terminal 11 transmits the received positional information and user identification information to the delivery apparatuses 10-1 to 10-2.

When the delivery apparatuses 10-1 to 10-2 receive the positional information and the user identification information from the wireless terminal 11, the delivery apparatuses 10-1 to 10-2 add communication date and time to the received information and transmit the received information together with the communication date and time to the gateway device 12.

When the gateway device 12 receives the information of the wireless terminal 11 from the delivery apparatuses 10-1 to 10-2, the gateway device 12 transmits the received information to the positional information management system 13. The positional information management system 13 stores the information of the wireless terminal 11 via the gateway device 12.

The MFP 16 may, for example, continually or periodically transmit usage information of the MFP 16 including an operating content such as copying (a copy operation) or printing (a print operation), operating date and time at which the operating content is performed, and apparatus identification information of the MFP 16 (i.e., apparatus ID (mfpID)).

When the apparatus management server 17 receives usage information of the MFP 16, the apparatus management server 17 stores the usage information such as an operating content, and operating date and time, and transmits the usage information of the MFP 16 to the flow line management server 18 in response to a request from the flow line management server 18.

The flow line management server 18, may for example, acquire positional information of the wireless terminal 11 from the positional information management system 13, and determines, when receiving the usage information of the MFP 16, flow lines for the user utilizing the MFP 16.

Note that the flow line management server 18 holds the positional information (i.e., apparatus arrangement information) of the MFP 16 in advance in this example. However, the apparatus management server 17 may alternatively hold the positional information of the MFP 16 in advance, and may add the positional information of the MFP 16 to the usage information of the MFP 16 when the usage information of the MFP 16 is transmitted to the flow line management server 18. Further, the positional information of the MFP 16 may be transmitted to the flow line management server 18 via the delivery apparatus 10 and the gateway device 12 by attaching the wireless terminal 11 to the MFP 16.

In addition, the flow line management system 13 may be configured to omit the apparatus management server 17 and the flow line management server 18 by allowing the positional information management system 13 to include the respective functions of the apparatus management server 17 and the flow line management server 18.

Further, in the above-described example, the positional information of the wireless terminal 11 is based on, but not limited to, the information delivered from the delivery apparatus 10. For example, the wireless terminal 11 may acquire the positional information utilizing a standardized wireless communications interface such as Wireless Fidelity (Wifi (Registered Trademark)), Bluetooth, or the like, or other wireless communications interfaces that are not standardized. Further, the wireless terminal 11 may acquire the positional information via radio-frequency identification (RFID) or the like, and transmit the acquired positional information to the positional information management system 13.

Note that the wireless terminal 11 may transmit only the above-described user identification information to the delivery apparatus 10, and may transmit the positional information held by the delivery apparatus 10 and the user identification information received from the wireless terminal 11 to the positional information management system 13.

Delivery Apparatus 10: Functional Block

Figure 4:
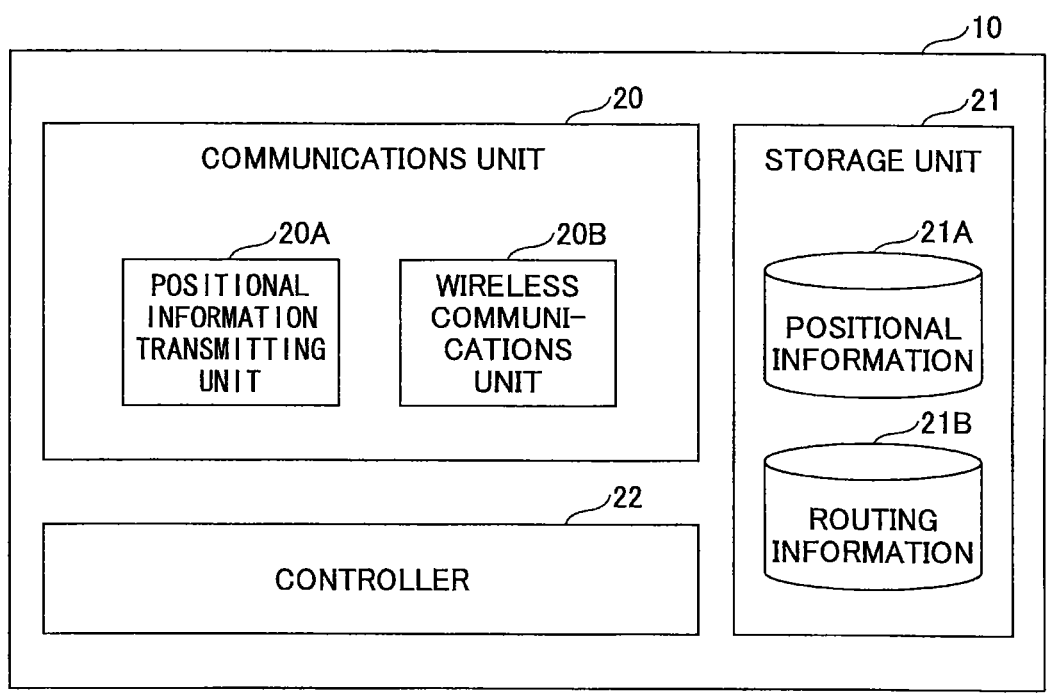
FIG. 4 is a diagram illustrating an example of a functional block of a delivery apparatus.

FIG. 4 is a diagram illustrating an example of a functional block of the delivery apparatus 10. As illustrated in FIG. 4, the delivery apparatus 10 includes a communications unit 20, a storage unit 21, and a controller 22.

The communications unit 20 includes a positional information transmitting unit 20A and a wireless communications unit 20B. The positional information transmitting unit 20A may continuously or intermittently transmit positional information 21A to the wireless terminal 11 within a predetermined radio wave based, for example, on indoor messaging system (IMES) signals, or the like. Note that the positional information transmitting unit 20A may, for example, transmit the positional information 21A utilizing the format specified in the IMES.

The wireless communications unit the gateway device 20B is configured to add, when receiving information transmitted from the wireless terminal 11 via the wireless network 14, communication date and time to the received information and transmit the received information with communication date and time to the gateway device 12 via short distance wireless communications system such as IEEE. 802.15.4 and ZigBee. Note that the information transmitted from the wireless terminal 11 may, for example, be the positional information received by the wireless terminal 11, user identification information of the user holding the wireless terminal 11, and the like.

For example, when the wireless network 14 is formed based on the ZigBee specification, the wireless communications unit 20B is configured to establish a route based on routing information held by the wireless communications unit 20B such that the information received from the wireless terminal 11 is transmitted to the gateway device 12.

The storage unit 21 may be configured to store, but not limited to, the positional information 21A or routing information 21B or the like. The positional information 21A may, for example, include the information such as the latitude, the longitude, the building number, the number of floors of the building, and the like. Note that the latitude and the longitude indicate the latitude and longitude of the position where delivery device 10 is situated. The building number indicates the building number of the building where the delivery apparatus 10 is situated. The number of floors indicates the number of floors of the building where the delivery apparatus 10 is situated.

Note that the positional information 21A is not limited to those contents described above. However, the positional information 21A may include information specifying a more precise position such as information representing partitions of a room. For example, the positional information 21A may include area information such as a room, a door number, and the like in an area subject to management.

The routing information 21B indicates, but not limited to, the minimum route from the delivery apparatus 10 to the gateway device 12. The routing information 21B is generated when the delivery apparatus 10 undergoes the control of the gateway device 12 at startup, and forms the aforementioned PAN to determine the minimum route to the gateway device 12.

The controller 22 is configured to control operations of the delivery apparatus 10. Note that when the PAN is formed of the delivery apparatus 10, the wireless terminal 11, and the gateway device 12 utilizing ZigBee, the controller 22 controls the delivery apparatus 10 such that the delivery apparatus 10 serves as a router function.

The delivery apparatus 10 forming the above-described configuration transmits positional information associated with setting positions. Further, when the delivery apparatus 10 receives from the wireless terminal 11 positional information of the wireless terminal 11 and the user identification information of the user holding the wireless terminal 11, the delivery apparatus 10 transmits the received positional and user identification information with added communication date and time information to the positional information management system 13 via the gateway device 12.

Flow Line Management Server 18: Functional Block

Figure 5:
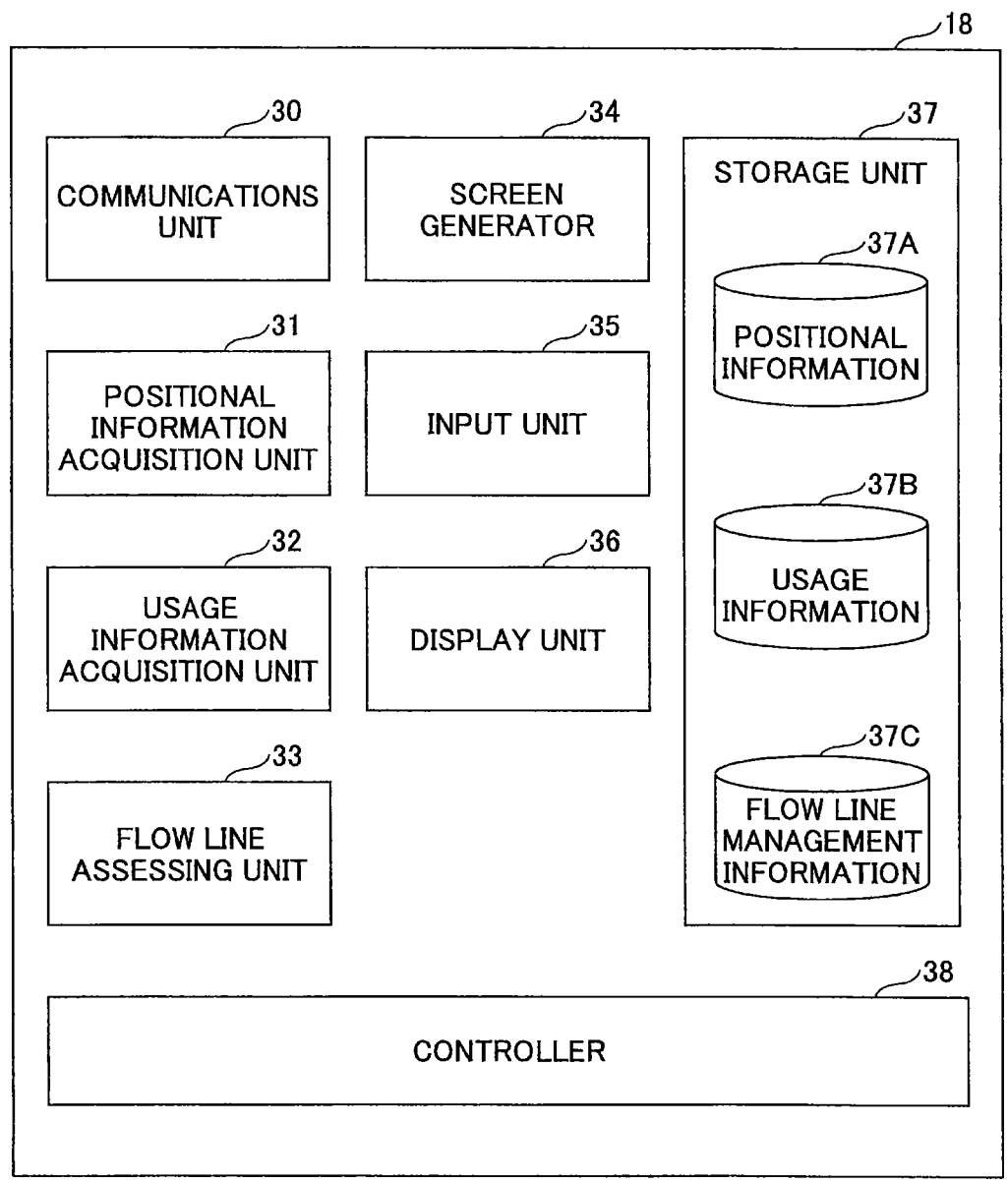
FIG. 5 is a diagram illustrating an example of a functional block of a flow line management server.

FIG. 5 is a diagram illustrating an example of a functional block of a flow line management server 18. As illustrated in FIG. 5, a flow line management server 18 includes a communications unit 30, a positional information acquisition unit 31, a usage information acquisition unit 32, a flow line determining unit 33, a screen generator 34, an input unit 35, a display unit 36, a storage unit 37, and a controller 38.

The communications unit 30 is configured to perform communications with the positional information management system 13 or the flow line management server 17 via the network 15.

The positional information acquisition unit 31 may, for example, acquire the positional information of the wireless terminal 11, which is held by the user utilizing the MFP 16, by the communications between the delivery apparatus 10 and the wireless terminal 11. Specifically, the positional information acquisition unit 31 may acquire the positional information of the wireless terminal 11, the user identification information, and the communication date and time information from the information received from the positional information management system 13, and store the acquired positional information, user identification information, and communication date and time information in the storage unit 37.

The usage information acquisition unit 32 may, for example, acquire usage information of the MFP 16. Specifically, the usage information acquisition unit 32 may acquire usage information including apparatus identification information of the MFP 16 and the like, an operating content, operating date and time information indicating operating content execution date and time from the information received from the apparatus management server 17, and store the acquired usage information in the storage unit 37.

The flow line determining unit 33 determines flow lines for the users utilizing the MFP 16, based on the positional information and the like acquired by the positional information acquisition unit 31 and the usage information acquired by the usage information acquisition unit 32. The flow line determining unit 33 may, for example, estimate a user performing the operation corresponding to the operating content of the MFP 16 and estimate a flow line starting time of the operating content. Note that the "flow line starting time of the operating content" indicates a flow line starting time at which the user starts migrating when the operator performs the operation corresponding to the operating content.

Specifically, the flow line determining unit 33 may determine at least one of a migrating timing, a migrating position, a migrating distance, and a migrating speed of the user corresponding to the operating content of the MFP 16 performed by the user, based on the communication date and time acquired by the positional information acquisition unit 31.

The flow line determining unit 33 may, for example, estimate a copying operator based on the user's migrating timing and migrating position when the operating content is a copy operation of the MFP 16. Further, the flow line determining unit 33 may, for example, estimate a printing operator based on the user's migrating timing, migrating position, and migrating distance when the operating content is a print operation of the MFP 16.

In addition, the flow line determining unit 33 may, for example, estimate a flow line starting time of the operating content of the MFP 16 based on the user's migrating speed.

The flow line determining unit 33 may be able to determine the flow line when the user utilizes the MFP 16 or the like, based on a transition of the positional information of the user until the operating date and time of the user operating the MFP 16, a transition of the positional information of the user from the print operating date and time of the user operating the MFP 16 to acquisition date and time of the user acquiring printed matter or print (i.e., printed matter acquisition time) from the MFP 16.

The screen generator 34 is configured to generate a screen for displaying a flow line when the user utilizes the MFP 16 or the like, which is acquired by the flow line determining unit 33.

The input unit 35 is configured to receive an input for acquiring the flow line when the user utilizes the MFP 16 or the like.

The display unit 36 may, for example, be formed of a graphical user interface (GUI) or the like. The display unit 36 is configured to display the screen generated by the screen generator 34.

The storage unit 37 may, for example, be configured to store positional information 37A, usage information 37B, flow line management information 37C, and the like. The storage unit 37 may be configured to further store, but not limited to, apparatus arrangement information of the MFP 16, and the like.

The positional information 37A may, for example, include positional information, user identification information, communication date and time information, and the like, received from the wireless terminal 11. The usage information 37B may, for example, include apparatus identification information, an operating content, operating date and time information, and the like, received from the apparatus management server 17.

The flow line management information 37C may, for example, include a flow line management number, apparatus identification information, an operating content, user identification information, positional information, an operating content, operating date and time information, and the like, received from the flow line management information 33.

The controller 38 is configured to control components of the flow line management server 18.

Delivery Apparatus 10: Hardware Configuration

Figure 6:
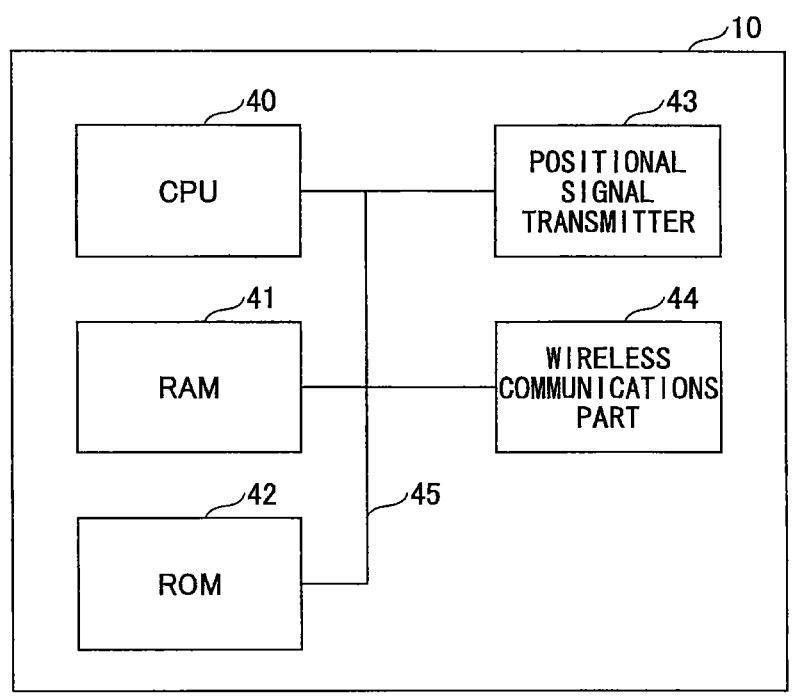
FIG. 6 is a diagram illustrating an example of a hardware configuration of the delivery apparatus.

FIG. 6 is a diagram illustrating an example of a hardware configuration of the delivery apparatus 10. As illustrated in FIG. 6, the delivery apparatus 10 includes a central processing unit (CPU) 40, a random access memory (RAM) 41, a read only memory (ROM) 42, a positional signal transmitter 43, and a wireless communications part 44. Note that the above-described components are connected via a bus 45.

The CPU 40 is configured to execute programs performing operational control of the delivery apparatus 10. The RAM 41 is configured to form a work area and the like of the CPU 40. The ROM 42 is configured to store the positional information 21A and the like in addition to the programs to be executed by the CPU 40.

The positional signal transmitter 43 includes an antenna to transmit positioning signals or the like such as IMES, and is configured to transmit the positional information 21A in a form of the IMES signals to the wireless terminal 11.

The wireless communications part 44 includes an antenna capable of transmitting or receiving radio waves compatible with the IEEE 802.15.4 standard, and is configured to transmit positional information, user identification information, and the like, received from the wireless terminal 11 to other delivery apparatuses 10 based on the routing information 21B held by the wireless communications part 44.

The bus 45 is configured to electrically connect between the above-described components and transmit or receive data between the components.

Flow Line Management Server 18: Hardware Configuration

Figure 7:
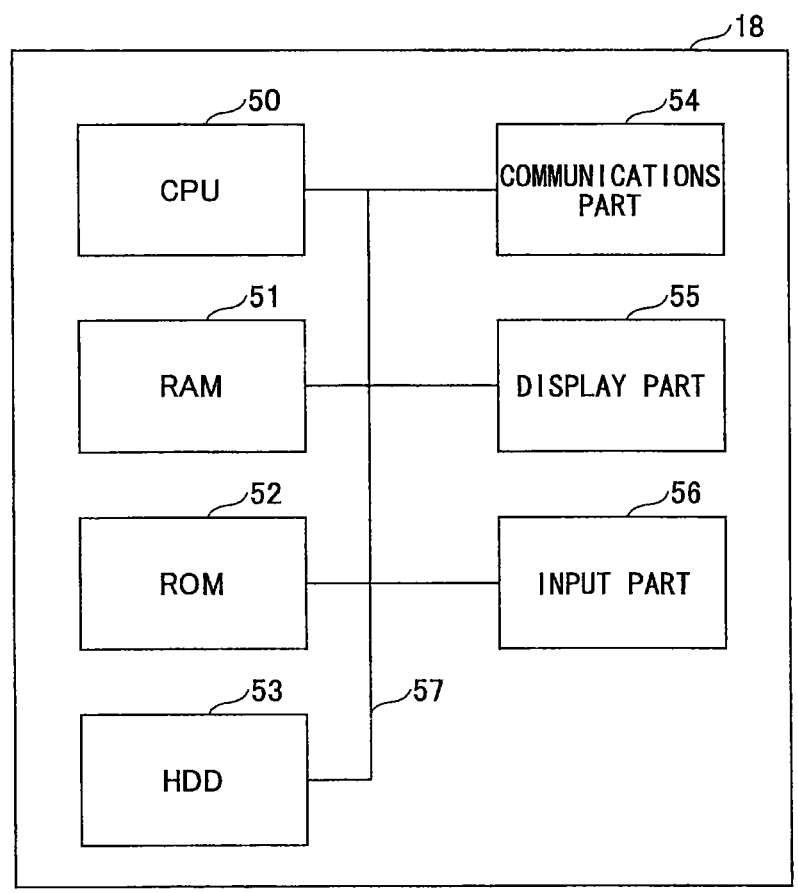
FIG. 7 is a diagram illustrating an example of a hardware configuration of the flow line management server.

FIG. 7 is a diagram illustrating an example of a hardware configuration of the flow line management server 18. The flow line management server 18 includes a central processing unit (CPU) 50, a random access memory (RAM) 51, a read only memory (ROM) 52, a hard disk drive (HDD) 53, a display part 55, and an input part 56. Note that the above-described components are connected via a bus 57.

The CPU 50 is configured to execute a program performing operational control of the flow line management server 18. The RAM 51 is configured to form a work area and the like of the CPU 50. The ROM 52 is configured to store programs to be executed by the CPU 50, data used for the execution of the programs, positional information 37A, usage information 37B, flow line management information 37C, apparatus arrangement information, and the like.

The HDD 53 is configured to store information utilized in the position management system 1 or the flow line management system 2, and information of the position of the wireless terminal 11 and its communication date and time, and information for managing usage information of the MFP 16. Note that the HDD 53 may be any types of a storage device including a tape, and a storage area being accessed via a network.

The communications part 54 may, for example, include a network interface compatible with the IEEE 802.3 standard, or the like.

The display part 55 may, for example, include a liquid crystal display, a cathode ray tube (CRT) display, or the like.

The input unit 56 serves as a pointing device such as a keyboard and a mouse that are configured to receive an input from the user. The bus 57 is configured to electrically connect between these components and transmit or receive data between the components.

Flow Line Determining Process Sequence

Figure 8:
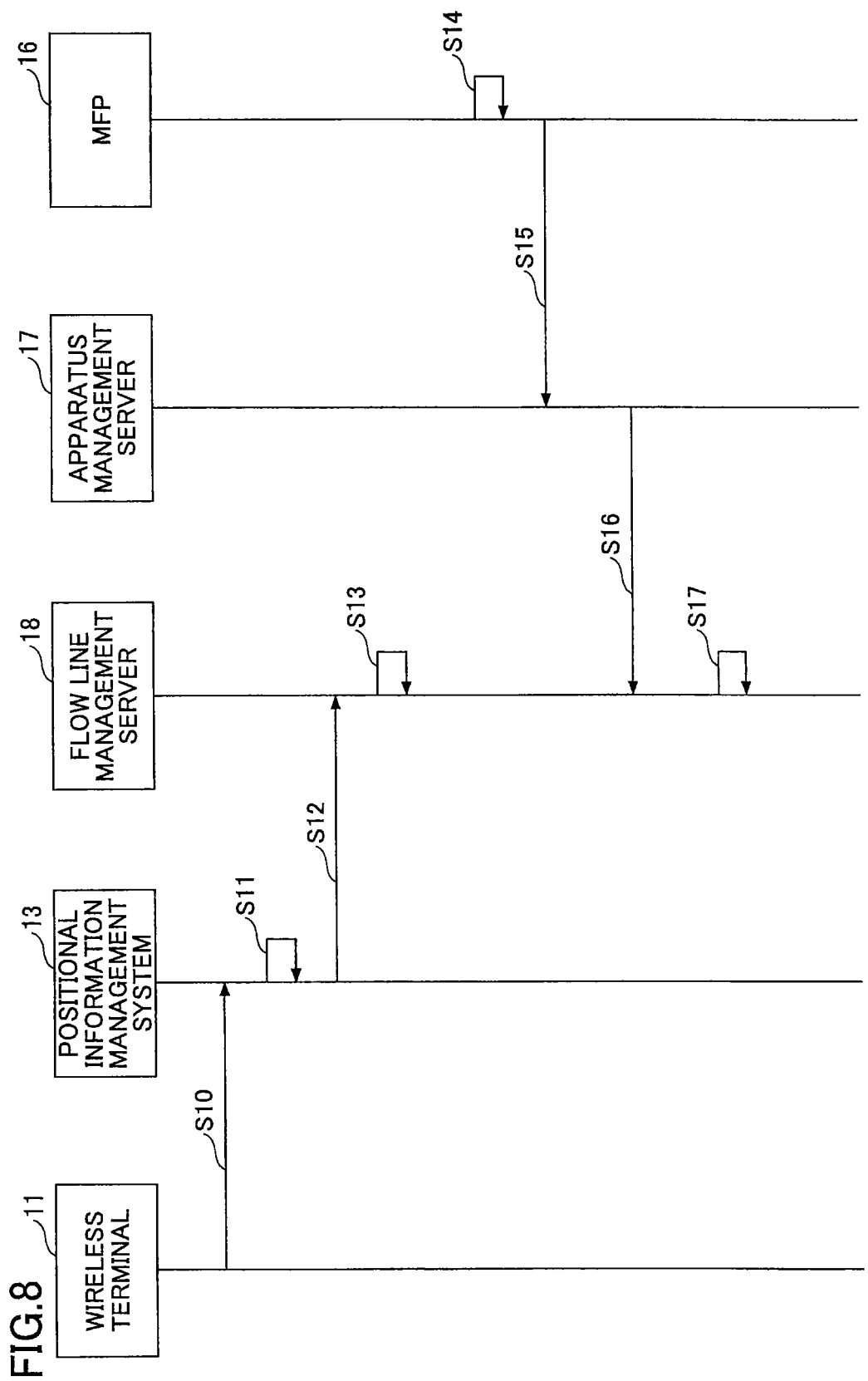
FIG. 8 is a diagram illustrating an example of a flow line determining process sequence.

FIG. 8 is a diagram illustrating an example of a flow line determining process sequence. Note that the example of the flow line determining process sequence illustrated in FIG. 8 may be illustrated using the wireless terminal 11, the positional information management system 13, the flow line management system 18, the apparatus management server 17, and the MFP 16.

As illustrated in FIG. 8, when the wireless terminal 11 held (owned) by the user A receives positional information, for example, from the delivery apparatus 10 or the like, the wireless terminal 11 transmits user identification information together with the received positional information to the positional information management system 13 via the delivery apparatus 10 and the gateway device 12 (step S10). Note that the wireless terminal 11 not only receives the positional information from the delivery apparatus 10 but also receives the positional information, for example, via other wireless communication systems such as wireless fidelity (WiFi), radio-frequency identification (RFID), and the like.

When the positional information management system 13 receives via the delivery apparatus 10 the positional information and the user identification information received by the wireless terminal 11, the positional information management system 13 stores the received positional information and the user identification information, manages the stored positional information of the wireless terminal 11 (step S11), and transmits the positional information of the wireless terminal 11 to the flow line management server 18 (step S12).

Note that the information received by the positional information management system includes the communication date and time information, which is added when the delivery apparatus 10 has received the positional information received from the wireless terminal 11.

The flow line management server 18 stores the information received from the positional information management system 13 (step S13).

When a predetermined operation such as copying (a copy operation) or printing (a print operation) is performed by the user A or the like (step S14), the MFP 16 continually or periodically transmits usage information of the MFP 16 including an operating content and operating date and time to the apparatus management server 17 (step S15). The apparatus management server 17 transmits the usage information received from the MFP 16 or the like to the flow line management server 18 (step S16).

The flow line management server 18 determines a flow line when the user A holding the wireless terminal 11 uses the MFP 16 based on the positional information received from the wireless terminal 11 and the usage information of the MFP 16 (step S17).

Flow Line Determining Process

Figure 9:
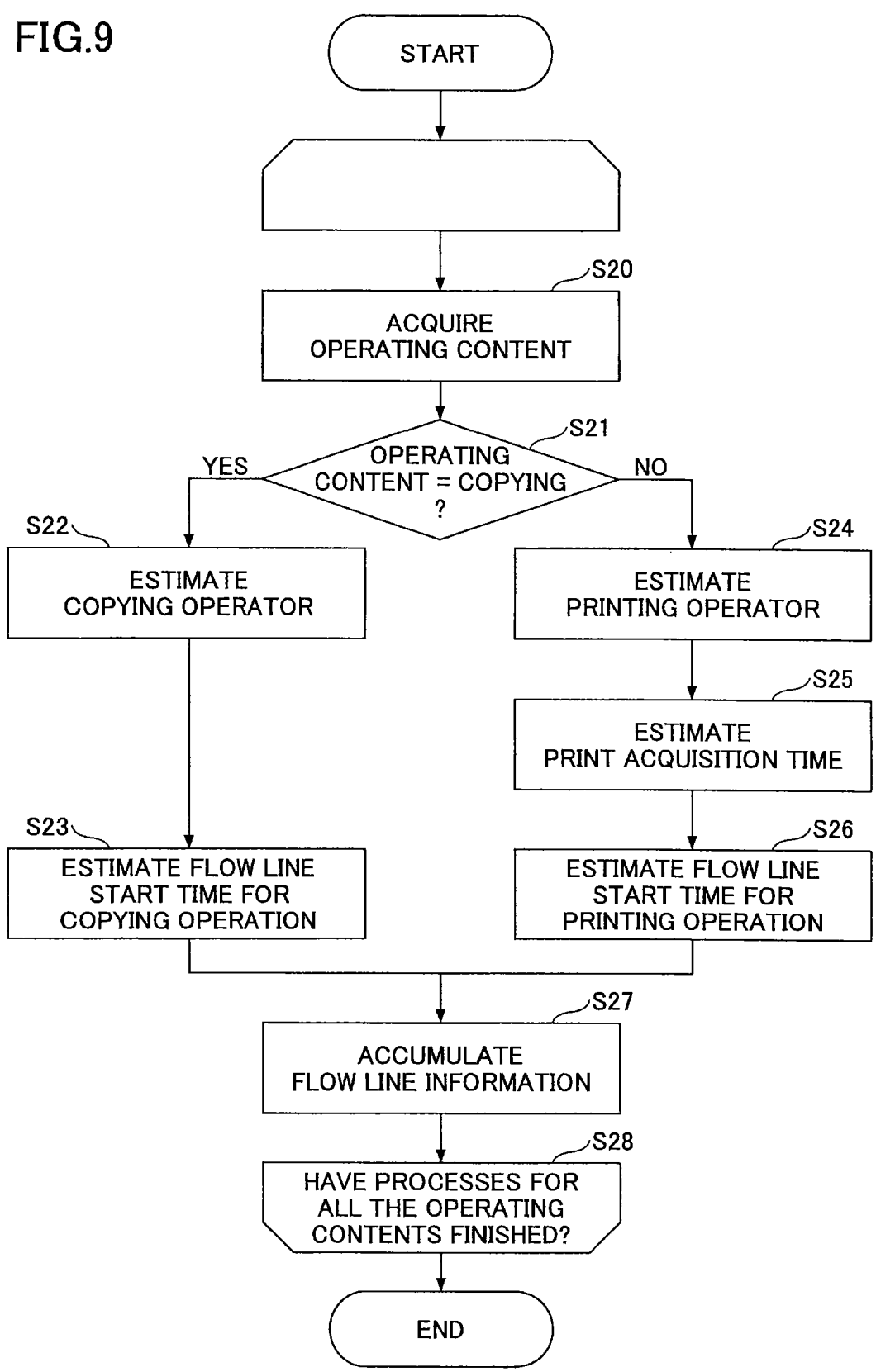
FIG. 9 is a flowchart illustrating the flow line determining process.

FIG. 9 is a flowchart illustrating a flow line determining process. As illustrated in FIG. 9, when the flow line management server 18 causes the flow line determining unit 33 to acquire an operating content of the MFP 16 from the usage information acquired from the apparatus management server 17 (step S20), the flow line determining unit 33 determines whether the operating content with respect to the MFP 16 is copy operation (step S21).

Note that in the process in step S21 illustrated above, the flow line determining unit 33 determines whether the operating content is a copy operation, and when the operating content is not a copy operation, the flow line determining unit 33 determines that the operating content is a print operation. However, the operating content is not limited to the copy operation or print operation. The operating content may, for example, include other operating contents such as a scan operation, a fax operation, and the like. Further, when there are two or more operating contents, the flow line management server 18 determines whether each of operations is performed based on a corresponding one of the operating contents.

When the flow line determining unit 33 determines that the operating content with respect to the MFP 16 is a copy operation ("YES" in step S21), the flow line determining unit 33 estimates a copying operator who has performed the copy operation. In this case, the flow line determining unit 33 estimates a person who is situated at a position closest to the MFP 16 at the time at which the person performs a copy operation (operating date and time) as the copying operator.

Specifically, the flow line determining unit 33 acquires the positional information of the MFP 16 from the storage unit 37 while acquiring the "communication date and time" and the "positional information" at a migrating timing around the time of the copy operation by referring to the positional information 37A. The flow line determining unit 33 estimates a person who is situated at a position closest to the MFP 16 at the time at which the person performs the copy operation as the copying operator based on the above-described information.

Note that the information included in the positional information 37A indicates the "communication date and time" and the "positional information" for each of the users. Hence, the flow line determining unit 33 needs to estimate where each of the users is situated at the time at which the person performs the copy operation. Accordingly, the flow line determining unit 33 assumes, for example, that each of the users migrates "linearly", and "isokinetically" "without being interrupted by an obstacle", and estimates a position of each user based on the ratio of the elapsed time of the "communication date and time" utilizing the "communication date and time" and the "positional information" around the time at which the copy operation is performed.

For example, L1 (the user's latitude at t1, and the user's longitude at t1) is defined as the positional information of the user at time t1 immediately before time t2 at which the position is desired to be estimated. Likewise, L3 (the user's latitude at t3, and the user's longitude at t3) is defined as the positional information of the user at time t3 immediately after time t2. In this case, the positional information L2, at which the position is desired to be estimated, is estimated by the following equation: $L2=L1+((t2-t1)/(t3-t1))(L3-L1)$. However, this position (i.e., migrating position) estimating method is not limited to the method represented by the above-described equation.

The flow line determining unit 33 computes a distance D between two points for each of the users by utilizing the positional information L2 (latitude and longitude) at time t2 at which the position is desired to be estimated and the positional information (latitude and longitude) of the MFP 16, and estimates the user situated at a position of the distance D having the minimum value is the copying operator. However, the position estimating method is not limited to the above-described method, which is represented by the above-described equation.

Next, the flow line determining unit 33 estimates a flow line starting time (date and time) of the copying operator (flow line starting time (date and time) at which the copying operator performs a copy operation) estimated in the process of step S22 (step S23). Note that the process in step S23 estimates time at which the copying operator estimated in step S22 starts migrating for performing the copy operation.

Specifically, the flow line determining unit 33 acquires the "communication date and time" and the "positional information" of the copying operator before the copy operation is performed, by referring to the positional information 37A. The flow line determining unit 33 estimates, as the flow line starting time (date and time), a time at which a migrating speed $v=|v|$ in a period around the "communication date and time" is less than or equal to a predetermined threshold $D_r$, based on the above-described acquired information.

For example, when L0 (latitude and longitude) is defined as the positional information of the copying operator at time t0 immediately before time t1, the low line determining unit 33 computes the migrating speed v between time t0 and time t1 based on the equation represented by $v=(L1-L0)/(t1-t0)$.

The flow line determining unit 33 estimates, as the flow line starting time (date and time), communication date and time when the migrating speed $v=|v|$ of the copying operator in the period around the "communication date and time" is less than or equal to the predetermined threshold $D_r$.

On the other hand, when the flow line determining unit 33 determines that the operating content with respect to the MFP 16 is not a copy operation ("NO" in step S21), the flow line determining unit 33 determines that the operating content is a print operation and estimates a printing operator (step S24).

In this case, the print operation may, for example, be manipulated by a personal computer (PC) situated at a predetermined position such as a user's seat, or the like, and hence, the user is assumed to migrate from the user's seat to the MFP 16 to fetch printed matter. In addition, the flow line determining unit 33 estimates a person who has started migrating after the time of the print operation (the operating date and time), and has moved to and is situated in front of the MFP 16 within a predetermined time.

Specifically, the flow line determining unit 33 acquires the "communication date and time" and the "positional information" of the person who has migrated at a timing after the person has performed the print operation, and has move to and is situated in font of the MFP 16 within the predetermined time such as three minutes from the time of the print operation (i.e., the time at which the person has performed the print operation) by referring to the positional information 37A. In addition, the flow line determining unit 33 computes a position (a migrated position) closest to the MFP 16 to which each of the users migrates within a predetermined time from the time of the print operation utilizing the "communication date and time" and the "positional information" by the position estimating method used in the process of step S22, and computes a distance $D_{min}$ having a minimum distance from the MFP 16.

Further, the flow line determining unit 33 computes a migrating distance of each of the users based on the positional information of the user at the time of the print operation and the positional information of the MFP 16, and estimates the user acquiring a maximum value for the ratio of computed migrating distance and the distance $D_{min}$ closest to the MFP 16, as the printing operator.

Next, the flow line determining unit 33 estimates a print acquisition time (printed matter acquisition date and time) at which the printing operator estimated in the process of step S24 has acquired printed matter from the MFP 16 (step S25). In this case, the flow line determining unit 33 estimates as the print acquisition time (printed matter acquisition date and time) a time (date and time) at which the distance $D_{min}$ is acquired between the MFP 16 and a position of the printing operator acquired (estimated) in the process of step S24.

Next, the flow line determining unit 33 estimates a flow line starting time (date and time) of the printing operator based on the estimated print acquisition time (printed matter acquisition date and time) (step S26). In this case, the flow line determining unit 23 estimates, as the flow line starting time (date and time) of the printing operator, communication date and time when the migrating speed v=|v| of the printing operator in a period around the "communication date and time" is less than or equal to the predetermined threshold $D_r$, utilizing corresponding communication dates and times and corresponding positional information before the print acquisition time (printed matter acquisition date and time) at which the printing operator acquires the printed matter, in a manner similar to the process of step S23.

Next, the flow line determining unit 33 creates flow line information utilizing the "communication dates and times" and the "positional information" from the flow line starting time (date and time) of the copy operation acquired in the process of step S23 to the time of the copy operation. Further, the flow line determining unit 33 creates flow line information by acquiring the "communication dates and times" and the "positional information" from the time of the print operation performed by the printing operator to the print acquisition time (printed matter acquisition date and time) acquired by the process of step S26 and accumulates (stores) the created flow line information in the flow line management information 37C (step S27).

In this case, the flow line determining unit 33 repeatedly performs the process of determining a flow line with respect to all the operating contents included in the usage information (step S28). Hence, when a flow line is yet to be determined with respect to all the operating contents, the flow line determining unit 33 returns to the process of step S20, whereas when a flow line is determined with respect to all the operating contents, the flow line determining unit 33 ends the flow line determining process. Hence, it may be possible to acquire flow line results corresponding to all the operating contents with respect to the MFP 16.

Information Transmitted from Delivery Apparatus 10

FIGS. 10A to 10C are diagrams illustrating examples of information transmitted from the delivery apparatuses 10. Note that FIGS. 10A to 10C illustrate examples of information transmitted from the respective delivery apparatuses 10 disposed at different positions.

As illustrated in FIGS. 10A to 10C, the information transmitted to the delivery apparatuses 10 may include "user identification number (uID)", "positional information", "communication date and time", and the like. The "user identification number (uID)" and the "positional information" may, for example, be the information that each of the delivery apparatuses 10 receives from the wireless terminal 11. Likewise, the "communication date and time" may be date and time at which each of the delivery apparatuses 10 receives the positional information and the like from the wireless terminal 11.

The example of FIG. 10A illustrates that the delivery apparatus 10 has received the positional information "N (latitude) 35.66.12, E (longitude) 139.74.56" at the communication date and time "7/5 10:30:40" from the wireless terminal 11 having the user identification information of "A-2".

Note that the identification information (ID) of the delivery apparatus 10 may be associated, in advance, with the positional information. In this case, the flow line management server 18 may be able to determine which one of the positions of the delivery apparatuses 10 is passed by the wireless terminal 11 based on the positional information acquired from the wireless terminal 11.

Since the information transmitted from the above-described delivery apparatus 10 indicates which one of the wireless terminals 11 is situated at what position and at what time, the flow line management server 18 may be able to determine the flow line holding the wireless terminal 11.

Information Acquired by Flow Line Management Server 18

FIGS. 11A and 11B are diagrams illustrating examples of information acquired by the flow line management server 18. More specifically, FIG. 11A illustrates an example of the positional information 37A acquired from the positional information management system 13, and FIG. 11B illustrates an example of the usage information 37B acquired from the apparatus management server 17.

As illustrated in FIG. 11A, the positional information management system 13 may, for example, transmit items such as the "communication date and time" and the "positional information" to the flow line management server 18 for every "user identification number (uID)" in response to a request from the flow line management server 18.

In the example of FIG. 11A, the communication dates and times of the user identification information "A-1" and "A-2" indicate different communication intervals between the user identification information "A-1" and "A-2", which may be due to different migration speeds between the users holding the wireless terminals 11 and different arrangement intervals of the delivery apparatuses 10.

In the process of step S22 illustrated in FIG. 9, the flow line management server 18 may, for example, estimate the copying operator by requesting the positional information management system 13 to transmit the "communication date and time" and the "positional information" around the copying date and time (e.g., 7/5 10:00:45).

Further, when the flow line management server 18 estimates the user identification information "A-1" as the copying operator, the flow line management server 18 acquires the "communication date and time" and the "positional information" of the user identification information "A-1" before the date and time of the copy operation to estimate a flow line starting time of the copying operator in the process of step S23.

Moreover, in the process of step S24, the flow line determining unit 18 requests the positional information management system 13 to transmit the "communication date and time" and the "positional information" of the person who is situated in front of the MFP 16 within a predetermined time after the printing date and time (7/5 10:29:55) so as to estimate the printing operator.

Further, as illustrated in FIG. 11B, the apparatus management server 17 may, for example, transmit items such as the "MFP identification information (mfpID)", the "operating date and time" and the "operating content" as usage information of the apparatus such as the MFP 16 to the flow line management server 18 in response to a request from the flow line management server 18. Note that the items to be transmitted to the above-described flow line management server 18 are not limited to those described above.

The flow line management server 18 may be able to determine a flow line when the user uses the apparatus by using the above-described information.

Flow Line Information Created by Flow Line Management Server 18

FIG. 12 is a diagram illustrating an example of flow line information created by the flow line management server 18. Note that FIG. 12 illustrates an example of flow line management information 37C.

The flow line management information 37C illustrated in FIG. 12 may, for example, include items such as a "flow line management number", "MFP identification information (mfpID)", an "operating content", "user identification information (uID)", "positional information", "date and time", and the like. For example, the flow line management number "L1" includes information indicating that a user having the user identification information "A-1" passes through each of paths illustrated in the positional information at corresponding times, in order to perform the operating content "COPY" of the MFP having the MFP identification information "16-2" at the operating date and time "7/5 10:00:45".

As described above, the flow line management server 18 causes the flow line determining unit 33 to estimate an operator and a flow line starting time with respect to each of the operations of a corresponding one of the apparatuses and determine a flow line based on transitions of the communication date and time, and the positional information of the estimated operator.

Example of Flow Line Information Displayed on Screen

Figure 13:
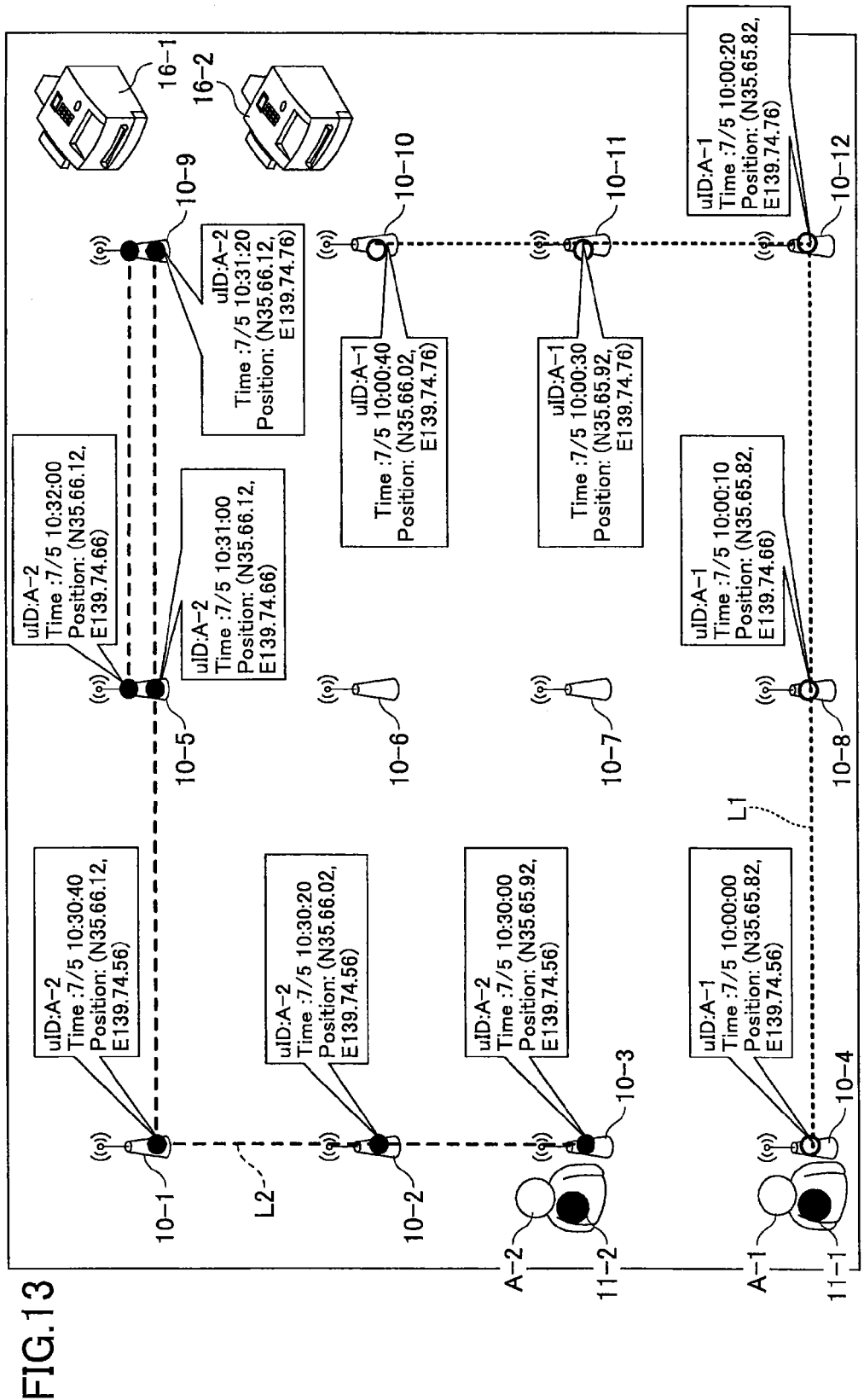
FIG. 13 is a diagram illustrating an example of flow line information displayed on a screen.

FIG. 13 is a diagram illustrating an example of flow line information displayed on a screen. FIG. 13 illustrates an example of a screen generated by the screen generator 34 based on the flow line management information 37C determined by the flow line determining unit 33 of the flow line management server 18. Note that the delivery apparatuses 10-1 to 10-12 each have functions identical to those of the delivery apparatus 10 illustrated in FIGS. 1 to 3.

The example of FIG. 13 illustrates flow line information of a user A-1 (uID: A-1) holding a wireless terminal 11-1 based on information associated with the flow line management number "L1" illustrated in FIG. 12. The flow line information of the user A-1, may, for example, indicate that the user A-1 passes through positions of the delivery apparatuses 10-8, 10-12, and 10-11, respectively, from a position of the delivery apparatus 10-4 (Position: (N35.65.82, E139.74.56)) at a time (Time: 7/5 10:00:00). The flow line information of the user A-1, may further indicate that the user A-1 has reached the delivery apparatus 10-10 and used (operated) an MFP 16-2 at a time (Time: 7/5 10:00:40). The example of FIG. 13 further illustrates flow line information of a user A-2 (uID: A-2) holding a wireless terminal 11-2 based on information associated with the flow line management number "L2" illustrated in FIG. 12. The flow line information of the user A-2, may, for example, indicate that the user A-2 passes through positions of the delivery apparatuses 10-2, 10-1, and 10-5, respectively, from a position of the delivery apparatus 10-3 (Position: (N35.65.92, E139.74.56)) at a time (Time: 7/5 10:30:00). The flow line information of the user A-2, may further indicate that the user A-2 has reached the delivery apparatus 10-9 and used (operated) an MFP 16-1 at time (Time: 7/5 10:31:20).

For example, the above-described flow line information illustrates that the users A-1 to A-2 situated on a lower left hand side of a plan view of a room illustrated in FIG. 13 use (operate) the MFPs 16-1 to 16-2 disposed on an upper right hand side of the plan view of the room. Hence, working efficiency may be improved by disposing the MFPs 16-1 to 16-2 at positions close to the users A-1 to A-2 or disposing seats of the users A-1 to A-2 at positions close to the MFPs 16-1 to 16-2.

In addition, the above-described flow line information may be statistically acquired for each of the users, and only one of the most frequently used flow lines for each of the apparatuses for a corresponding one of the users may be displayed on the screen. Hence, the apparatuses and the users' seats may appropriately be arranged.

Note that the flow line information displayed on the screen illustrated in FIG. 13 is not limited to the example illustrated in FIG. 13. For example, the flow line information may include information about a seat and a PC of each of the users, walls, and other apparatuses. The flow line information is not limited to the flow line from the user's seat to each of the apparatuses. The flow line information may further include a return flow line from each of the apparatuses to the user's seat. That is, the flow line information include the outward flow line from each of the users' seats to each of the apparatuses and the return flow line from each of the apparatuses to each of the users' seats, and the outward flow line and the return flow line may be displayed on the screen such that the outward flow line and the return flow line are mutually distinguishable.

Second Embodiment

Position Management System: Schematic Configuration

The flow line management system 2 illustrated in the first embodiment may be able to determine a user's flow line based on positional information of a wireless terminal 103 acquired by the position management system illustrated in a second embodiment.

Figure 14:
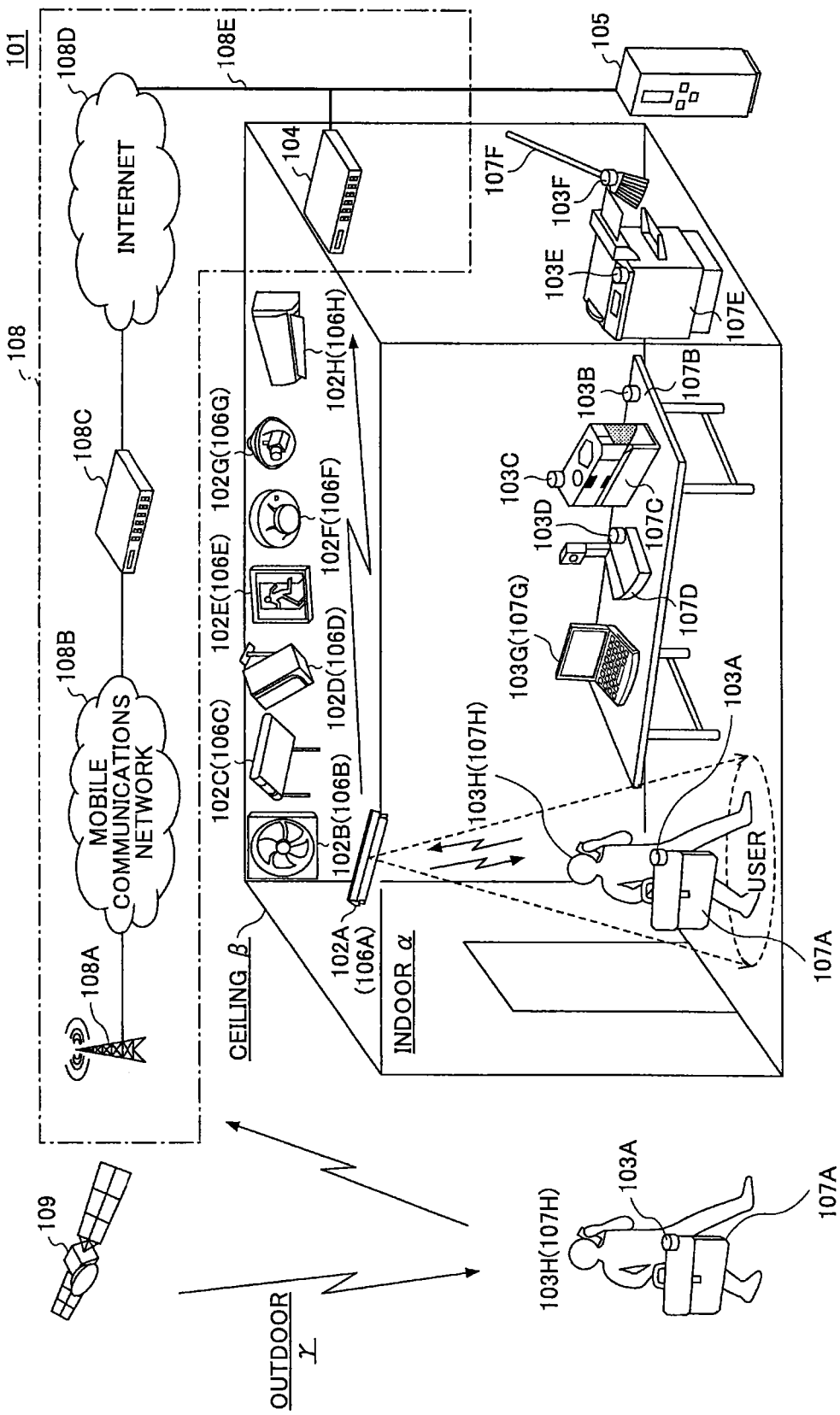
FIG. 14 is a schematic configuration diagram illustrating an example of a position management system according to a second embodiment.

FIG. 14 is a schematic configuration diagram illustrating an example of the position management system according to the second embodiment. As illustrated in FIG. 14, a position management system 101 includes delivery apparatuses 102A to 102H, wireless terminals 103A to 103H, a gateway device 104, and a positional information management system 105. Note that in the following description, wherever appropriate, the delivery apparatuses 102A to 102H are simply referred to as "delivery apparatus(es) 102", and the wireless terminals 103A to 103H are simply referred to as "wireless terminal(s) 103".

In the second embodiment, it is assumed that the delivery apparatuses 102A to 102H disposed on a ceiling β within indoor α environment (indoor α) are incorporated in the electric apparatuses 106A to 106H (hereinafter also referred to as "electric apparatuses 106" wherever appropriate) or externally disposed. The delivery apparatuses 102A to 102H are configured to store positional information at which the delivery apparatuses 102A to 102H are disposed, and deliver positional information XA to XH (hereinafter also referred to as "positional information X" wherever appropriate) with respect to the wireless terminals 103A to 103H present in a predetermined radio wave range (i.e., a region subject to management) via wireless communications.

Note that the above-described predetermined radio wave range is determined based, for example, on an output transmitted from each of the delivery apparatuses 102A to 102H, directivity of an antenna, and the like. However, a cone-shaped broken line illustrated beneath the delivery apparatus 102A indicates the predetermined radio wave range of the delivery apparatus 102A in the example of FIG. 12.

Note that it is assumed that the delivery apparatuses 102A to 102H are configured to store apparatus identification information AA to AH (hereinafter also called "apparatus identification information A" wherever appropriate) for identifying the delivery apparatuses 102A to 102H, respectively.

The wireless terminals 103A to 103H may, for example, receive positional information XA to XH from the delivery apparatuses 102A to 102H, respectively. In example of FIG. 14, it is assumed that the wireless terminals 103A to 103H are attached to management target objects 107A to 107H subject to management (hereinafter also referred to as "management target object(s) 107) managed by the positional information management system 105.

The wireless terminals 103A to 103H may, for example, transmit the positional information XA to XH received via the wireless communications to the delivery apparatuses 102A to 102H, respectively, together with their own terminal identification information BA to BH (hereinafter also called "terminal identification information B" wherever appropriate). Note that a media access control (MAC) address, and the like may be employed as the terminal identification information B.

Note also that the wireless terminal 103 may, for example, acquire target object information to specify the management target objects 107 from the management target objects 107, respectively, and transmit the acquired target object information together with the above-described positional information X or its own apparatus identification information B to the delivery apparatuses 102A to 102H, respectively. In addition, when the wireless terminal 103 has already transmitted the management target information of the management target object 107 together with its own terminal identification information B, the wireless terminal 103 may transmit only the positional information and its own terminal identification information B.

Each of the electric apparatuses 106 (106A to 106H) is configured to supply electric power to the delivery apparatus 102. In the example of FIG. 14, the electric apparatus 106A serves as a fluorescent light emitting diode (LED) illuminator. The electric apparatus 106B serves as an exhaust fan. The electric apparatus 106C serves as a wireless local area network (LAN) access point. The electric apparatus 106D serves as a speaker.

The electric apparatus 106E serves as an emergency lamp. The electric apparatus 106F serves as a fire alarm or a smoke detector. The electric apparatus 106G serves as a monitoring camera. The electric apparatus 106H serves as an air conditioner. The electric apparatuses 106 are not limited to the above-described examples insofar as the electric apparatuses 106 are able to supply electric power to the respective delivery apparatuses 102. The electric apparatus 106 may be an apparatus other than the electric apparatuses illustrated in FIG. 14. For example, the electric apparatus 106 may, for example, be an illuminator such as a general fluorescent lamp, incandescent lamp, or a security sensor to detect a person intruding from outside.

The position of each of the management target objects 107 (107A to 107H) each provided with the wireless terminal 103, is managed by the positional information management system 105. The management target object 107A is a bag. The management target object 107B is a table. The management target object 107C is a projector. The management target object 107D is a television conference terminal. The management target object 107E is a multifunctional peripheral including a copying function. The management target object 107F is a broom.

The management target object 107G is a personal computer (PC). Note that the PC includes a function of the wireless terminal 103, and hence, the management target object 107G may serve as a wireless terminal 103G. The management target object 107H is a mobile phone such as a smartphone, or the like. Note that the mobile phone includes a function of the wireless terminal 103, and hence, the management target object 107H may serve as a wireless terminal 103H.

Note that the management target objects 107 may be those other than the target objects illustrated in FIG. 14. The management target objects 107 may, for example, be a facsimile machine, a scanner, a printer, a copier, an electronic whiteboard, an air washer, a shredder, an automatic vending machine, a watch, a camera, a gaming machine, a wheelchair, a medical instrument such as an endoscope or the like. Further, when the wireless terminal 103 and the management target object 107 are mutually communicable, the management target object 107 may store target object information in advance, and the wireless terminal 103 may acquire the target object information from the management target object 107.

Next, a description is given of an example of a positional information management method utilizing the positional management system 101 having the above-described configuration. For example, the delivery apparatus 102A disposed on a ceiling β within indoor α environment (indoor α) delivers the positional information XA indicating its disposed position via wireless communications.

The wireless terminal 103A may, for example, transmit, on receiving the positional information XA, the received positional information XA and terminal identification information BA for identifying the wireless terminal 103A to the delivery apparatus 102A.

Note that when the wireless terminal 103A receives the positional information X from plural delivery apparatuses 102 illustrated in FIG. 14, respective signal intensities of the positional information X received from the delivery apparatuses 102 are measured, and one of the positional information X associated with the highest intensity may be determined as a current positional information X. Further, when the wireless terminal 103A receives joining responses for joining a wireless network with respect to joining requests for joining the wireless network from plural delivery apparatuses 102, the wireless terminal 103A may determine the delivery apparatus having the apparatus identification information A included in the joining response associated with the highest signal intensity as a transmission destination of the positional information X. Note that the communication status between the delivery apparatuses 102 and the wireless terminals 103 will be described later.

When the wireless terminal 103A includes an acceleration sensor, the wireless terminal 103A may perform the above-described transmitting or receiving operation at a predetermined time where the acceleration sensor inside the wireless terminal 13A detects a change in its acceleration.

When the delivery apparatus 102A receives the terminal identification information BA and the positional information XA from the wireless terminal 103A, the delivery apparatus 102A transfers the received information (i.e., the terminal identification information BA and the positional information XA) to the gateway device 104 via wireless communications.

Note that the delivery apparatus 102A may, for example, perform data transmission or reception utilizing a 920 MHz band, and may perform data transmission or reception by utilizing at least a physical layer in IEEE 802.15.4 standardized architectural model (i.e., an open system interconnection (OSI) reference model).

When the delivery apparatus 102A employs ZigBee as the wireless communications system, the delivery apparatus 102A transmits data to the gateway device 104 via other delivery apparatuses 102 adjacent to the delivery apparatus 102 by utilizing a 800 MHz band, a 900 MHz band, 2.4 GHz MHz band, and the like, based on usage regions such as Japan, USA, and Europe, and the like. The delivery apparatus 102A may simply perform communications with electric power that allows data to approximately reach one of other delivery apparatuses 102 disposed closest to the delivery apparatus 102A by utilizing a multihop communications system configured to transmit data via the delivery apparatuses 102. Hence, the delivery apparatus 102A may be driven in a power saving mode.

Note that the wireless network formed of the delivery apparatuses 102 and the gateway device 104 may be formed by causing the delivery apparatuses 102 to initially transmit joining requests with respect to the gateway device 104 by switching on the electric apparatuses 106. Further, the wireless network may be formed by causing the delivery apparatuses 102 to store the apparatus identification information C of the gateway device 104 included in the joining response from the gateway device 104.

The gateway device 104 may, for example, transmit the terminal identification information BA and the positional information XA of the wireless terminal 103A to the positional information management system 105 via LAN 108E. The gateway device 104 may, for example, be configured to convert the communications system (i.e., the communication protocol) in compliance with the IEEE 802.15.4 into the communications system in compliance with the IEEE 802.3 to control such that various types of information are transmitted via Ethernet (registered trademark) by packet communications.

The positional information management system 105 is configured to manage the positional information of the management target object 107 by acquiring the terminal identification information BA and the positional information X of the wireless terminal 103A. The positional information management system 105 may be able to manage the positional information of the management target object 107 based on the positional information X received from the wireless terminal 103 by associating the terminal identification information B of the wireless terminal 103 with target object information of the management target object 107 in advance.

The wireless terminals 103G and 103H illustrated in FIG. 14 may, for example, receive, when being outside γ, wireless signals (e.g., time information and orbit information) from the global positioning system satellite 109 to compute respective positions of the wireless terminals 103G and 103H on the earth. The wireless terminals 103G to 103H may utilize mobile communications systems such as $3^{rd}$ generation (3G), $4^{th}$ generation mobile communications systems. The wireless terminals 103G and 103H transmit the positional information X or the terminal identification information B to the positional information management system 105 via a base station 108A, a mobile communications network 108B, a gateway device 108C, the Internet 108D, and the LAN 108E.

The communication network 108 may be formed of the base station 108A, the mobile communications network 108B, the gateway device 108C, the Internet 108D, LAN 108E, and the gateway device 104. Note that in order to compute latitude and longitude on the earth, at least three (or four when including the computation of altitude) GPS satellites; however, the example of FIG. 14 illustrates a GPS 109 alone.

Wireless Terminal 103: Functional Block

Figure 15:
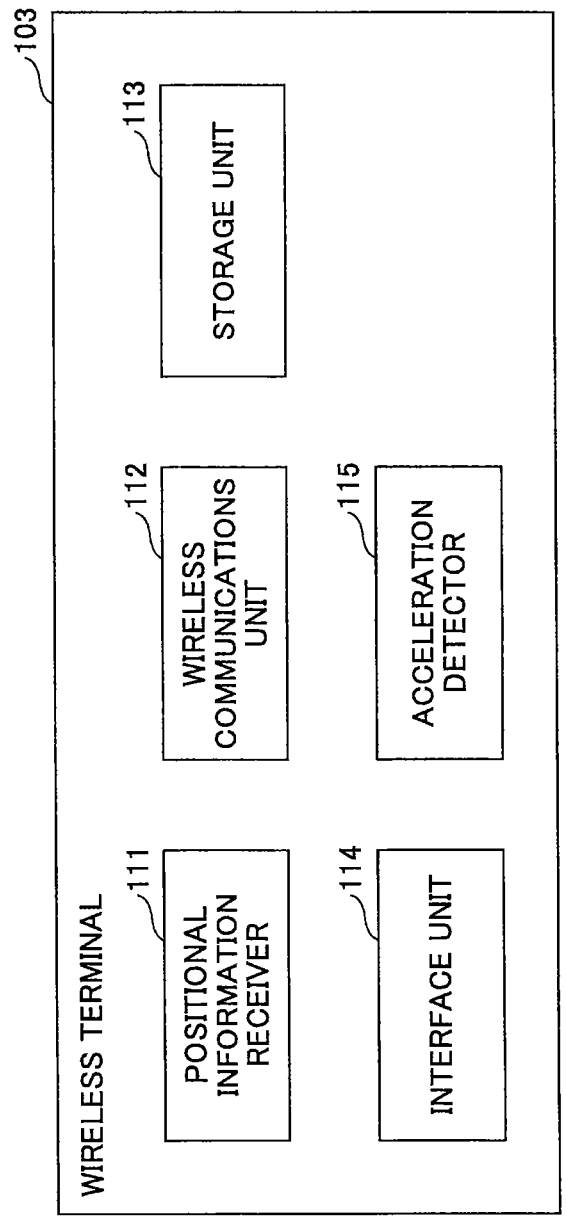
FIG. 15 is a diagram illustrating an example of a functional block of a wireless terminal.

FIG. 15 is a diagram illustrating an example of a functional block of the wireless terminal 103. As illustrated in FIG. 15, the delivery apparatus 103 includes a positional information receiver 111, a wireless communication unit 112, a storage unit 113, an interface unit 114, and a acceleration detector 115.

The positional information receiver 111 may, for example, receive the positional information XA transmitted from the delivery apparatuses 102. The positional information received by the positional information receiver 111 may be stored in the storage unit 113. Note that when the positional information receiver 111 receives the positional information X from plural delivery apparatuses 102, respective signal intensities of the positional information X received from the delivery apparatuses 102 are measured, and one of the positional information X associated with the highest intensity may be determined as a current positional information X.

The wireless communications unit 112 may, for example, transmit to or receive from the delivery apparatuses 102 various data via a wireless communications system by utilizing a band the same as bands of the delivery apparatuses 102. The wireless communications unit 112 may transmit the positional information X and the terminal identification information B stored in the storage unit 113 to the delivery apparatuses 102.

When the storage unit 113 stores target object information of the management target object 107, the wireless communications unit 112 may transmit the target object information of the management target object 107 to the delivery apparatuses 102 together with the positional information X and the terminal identification information B. Note that the wireless communications unit 112 may, once receiving the target object information of the management target object 107, transmit the positional information X and the terminal identification information B at a predetermined time.

When the wireless communications unit 112 receives joining responses for joining a wireless network with respect to joining requests for joining the wireless network from plural delivery apparatuses 102, the wireless communications unit 112 may determine the delivery apparatus having the apparatus identification information A included in the joining response associated with the highest signal intensity as a transmission destination of the positional information X.

The storage unit 113, for example, stores the positional information X received from the delivery apparatuses 102, the terminal identification information B for identifying the wireless terminals 10, the target object information acquired from the management target objects 107; however, the items stored in the storage unit 113 are not limited to above-described examples.

The interface unit 114 is a communicable interface equivalent to the management target objects 107 and the like, and includes the universal serial bus (USB) interface (I/F) which is one of the specifications associated with the above serial bus; however, the interface unit 114 is not limited to the above-described example.

The interface unit 114 may, for example, be any of Bluetooth, a wireless LAN, and ZigBee in a case of wireless communications, or may be a secure digital (SD) interface, or the like in a case of wired communications. When acquiring the target object information by connecting to the management target objects 107, the interface unit 114 may, for example, store the acquired target object information.

The acceleration detector 115 may, for example, be configured to detect change in the acceleration of the wireless terminal 103 when the wireless terminal 103 starts migrating or stops migrating. The wireless terminal 103 transmits or receives the positional information X at a predetermined time at which the acceleration detector 115 detects the change in the acceleration.

The wireless terminal 103 having the above-described configuration may be able to transmit information such as the positional information X or the terminal identification information B to the positional information management system 105 via the delivery apparatuses 102.

Wireless Terminal 103: Hardware Configuration

Figure 16:
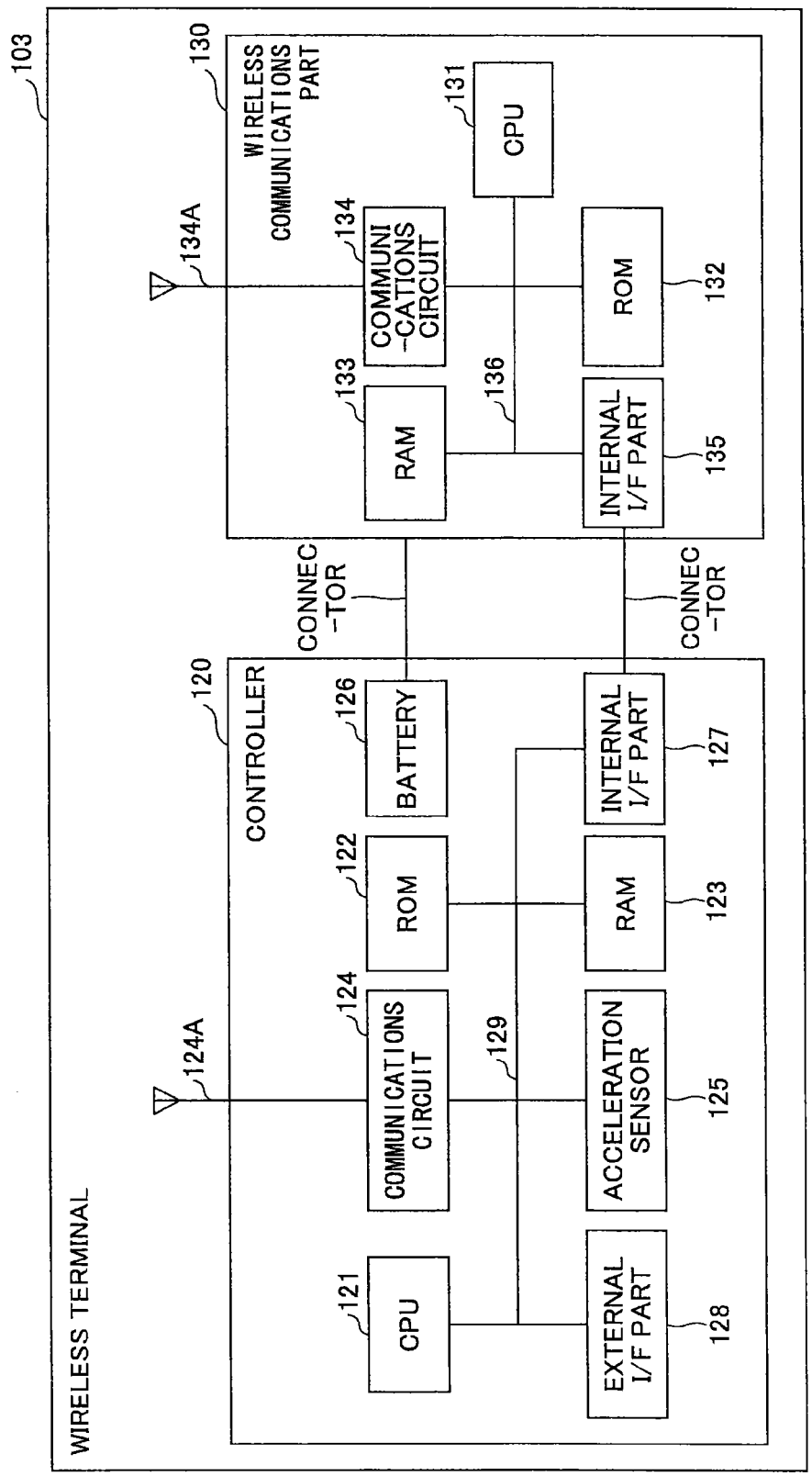
FIG. 16 is a diagram illustrating an example of a hardware configuration of the wireless terminal.

FIG. 16 is a diagram illustrating an example of a hardware configuration of the wireless terminal 103. As illustrated in FIG. 16, the delivery apparatus 103 includes a controller 120, and a wireless communications part 130.

The communications unit 120 includes a central processing unit (CPU) 121, a read only memory (ROM) 122, a random access memory (RAM) 123, and a communications circuit 124. Further, the controller 120 includes an acceleration sensor 125, a battery 126, an internal interface (I/F) part 127, an external interface (I/F) part 128, and a bus line 129.

The CPU 121 is configured to control the overall controller 120. The ROM 122 is configured to store basic input/output programs, and the like. The RAM 123 is configured to serve as a work area of the CPU 121. In addition, the RAM 123 is configured to store positional information X, and the like. The communications circuit 124 may receive the positional information X delivered, for example, by utilizing an indoor messaging system (IMES) via an antenna 124A.

The acceleration sensor 125 is configured to detect a change in acceleration of the wireless terminal 103. The change in the acceleration may, for example, be detected when the wireless terminal 103 starts migrating or stops migrating, or when the wireless terminal 103 inclines, or the like. Note that the acceleration sensor 125 may, for example, employ a motion sensor, and the like utilizing inertial force or magnetic force.

The battery 126 is a communications-specific battery, such as a button battery or dry cell battery, configured to supply electric power to components of the controller 120. The internal I/F part 127 is configured to transmit to or receive from the wireless communications part 130 signals via a connector.

The external I/F part 128 may, for example, serve as an interface to perform data communications by connecting to an external apparatus such as the management target objects or the like, and may serve as a USB I/F, Bluetooth, the wireless LAN, ZigBee, an SD interface, and the like.

The bus line 129 may, for example, serve as an address bus or a data bus for electrically connecting between the above-described components. Note that the controller 120 may be able to supply electric power to the wireless communications part 130 via the connector from the battery 130.

The wireless communication part 130 includes a central processing unit (CPU) 131, a read only memory (ROM) 132, a random access memory (RAM) 133, a communications circuit 134, an internal I/F part 135, and a bus line 136. The wireless communications part 130 may, for example, transmit to or receive from the delivery apparatus 102 data via a wireless communications system by utilizing a band the same as the bands of the delivery apparatus 102. The wireless communications part 130 may, for example, utilize Zig Bee, and the like.

The CPU 131 is configured to control the overall wireless communications part 130. The ROM 122 is configured to store basic input/output programs, terminal identification information B of the wireless terminal 103 and the like. The RAM 133 is configured to serve as a work area of the CPU 131.

The communications circuit 134 may transmit the positional information X, the terminal identification information B, and the like to the delivery apparatus 102 via the antenna 134A. The communications circuit 134 may, for example, transmit the positional information X including the number of floors, the latitude, the longitude, and the building number, respective fields of which are expressed by 9 bits, 21 bits, 21 bits, and 8 bits, with the format obtained by connecting between respective fields of a message received, for example, via the IMES specification.

Note that representational forms of the respective fields may, for example, be in compliance with the IMES specification, or headers or checksum information specified by the communications system may be added in addition to the above-described format.

The internal I/F part 135 is configured to transmit to or receive from the controller 120 signals via a connector. The bus line 136 may, for example, serve as an address bus or a data bus for electrically connecting between the above-described components.

The wireless terminal 103 having the above-described configuration may be able to transmit the positional information X and the terminal identification information B of the wireless terminal 103 to the positional information management system 105 via the delivery apparatus 102.

Communications Status Between Plural Delivery Apparatuses and Wireless Terminal

Figure 17:
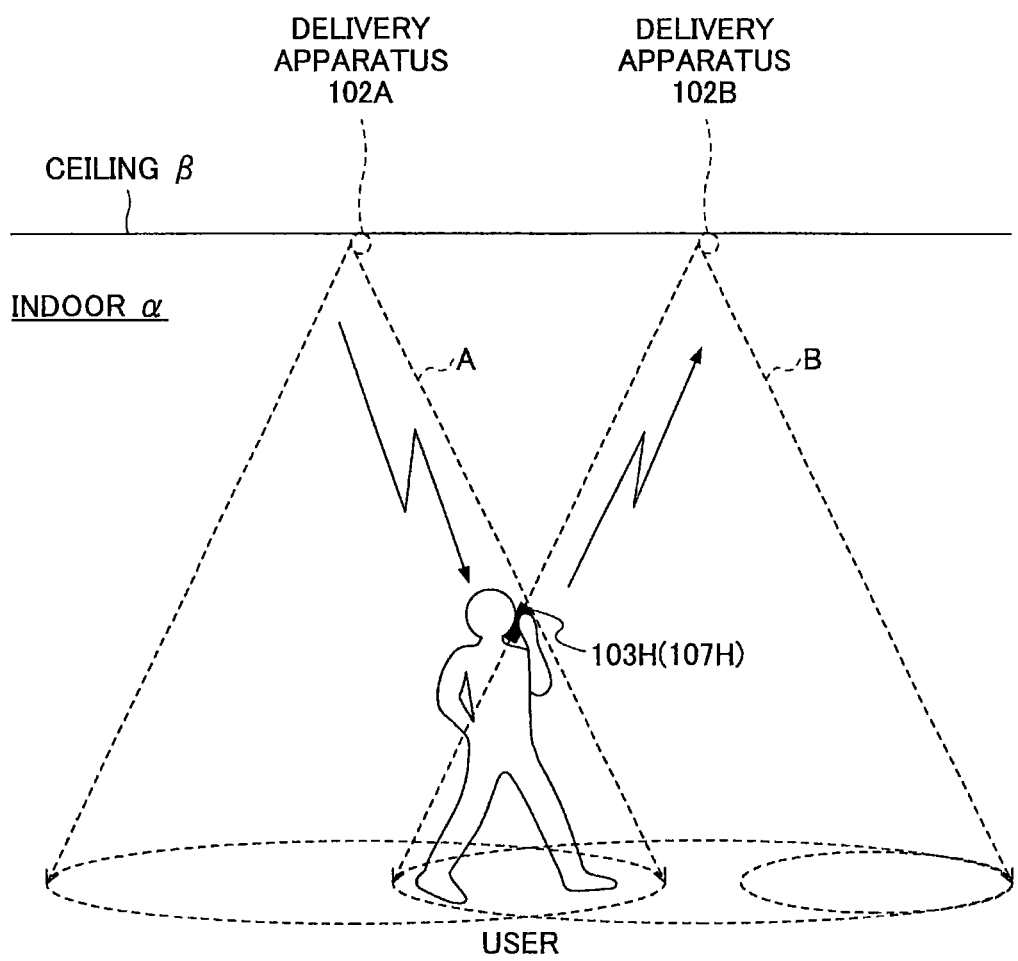
FIG. 17 is a diagram illustrating a communication status between plural delivery apparatuses and a wireless terminal.

FIG. 17 is a diagram illustrating a communication status between plural delivery apparatuses 102A and 102B and a wireless terminal 103H. As illustrated in FIG. 17, when the delivery apparatuses 102A and 102B are disposed on a ceiling β, the delivery apparatus 102A transmits positional information XA in a range indicated by a broken line A, and similarly, the delivery apparatus 102B transmits positional information XB in a range indicated by a broken line B.

Note that when the wireless terminal 103H is present in a range to which the positional information XA and the positional information B are delivered, and receives the positional information XA and the positional information B, the wireless terminal 103H measures respective signal intensities of the positional information XA and XB, and determines one (e.g., positional information XA) of the positional information XA and XB associated with the highest intensity as a current positional information. The wireless terminal 103H may, for example, transmit a joining request for joining a wireless network formed of the delivery apparatus 102A and the delivery apparatus 102B at a predetermined time, and measure signal intensities of respective joining response data received from the delivery apparatus 102A and the delivery apparatus 102B. When the signal intensity of the joining response data received from the delivery apparatus 102B is higher than that of the joining response data received from the delivery apparatus 102A, the wireless terminal 103H may, for example, determine the delivery apparatus 102B as a transmission destination of the positional information XA.

Thus, when the wireless terminal 103H determines the positional information XA received from the delivery apparatus 102A as a current positional information based on the position of the wireless terminal 103H with respect to indoor α, and determines the delivery apparatus 102B as a transmission destination, the wireless terminal 103H transmits the terminal identification information B and the positional information XA to the delivery apparatus 102B.

Hence, the positional information management system 105 may be able to manage the positional information of the wireless terminal 103, and the flow line management system 2 may be able to determine a user's flow line, based on the positional information and the like managed by the positional management system 105.

As described above, according to the above-described embodiments, it may be possible to determine an appropriate flow line with respect to a user utilizing an apparatus. Specifically, according to the above-described embodiments, it may be possible to extract a flow line based on the operating content, the operating time, and the migrating content of the wireless terminal held by the user corresponding to the operating time.

According to the above-described embodiments, it may be possible to determine an appropriate flow line with respect to a user utilizing an apparatus.

Although the embodiments and modifications are numbered with, for example, "first", or "second", the ordinal numbers do not imply priorities of the embodiments. Many other variations and modifications will be apparent to those skilled in the art.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

The present application is based on and claims the benefit of priority of Japanese Priority Application No. 2012-205086 filed on Sep. 18, 2012, and Japanese Priority Application No. 2013-183393 filed on Sep. 4, 2013, the entire contents of which are hereby incorporated by reference.

What is claimed is:

1. A flow line management apparatus, comprising:
a usage information acquisition unit configured to acquire operation information of an apparatus disposed at a predetermined position;
a positional information acquisition unit configured to acquire positional information of a wireless terminal held by a user operating the apparatus, the positional information having been transmitted to and received by the wireless terminal; and
a flow line determining unit configured to determine a flow line when the user operates the apparatus based on the operation information acquired by the usage information acquisition unit and the positional information acquired by the positional information acquisition unit.

2. The flow line management apparatus as claimed in claim 1, wherein
the usage information acquisition unit is configured to acquire the operation information including an operating content of the apparatus and operating date and time at which the operating content is executed.

3. The flow line management apparatus as claimed in claim 1, wherein
the positional information acquisition unit is configured to acquire user identification information of the user holding the wireless terminal, and communication date and time at which the wireless terminal has communicated, together with the positional information.

4. The flow line management apparatus as claimed in claim 2, wherein
the flow line determining unit is configured to estimate a user performing an operation corresponding to the operating content of the apparatus.

5. The flow line management apparatus as claimed in claim 2, wherein
the flow line determining unit is configured to estimate a flow line starting time at which the user starts migrating when the user performs an operation corresponding to the operating content.

6. The flow line management apparatus as claimed in claim 3, wherein
the flow line determining unit is configured to determine at least one of a migrating timing, a migrating position, a migrating distance, and a migrating speed of the user when the user performs an operation corresponding to the operating content of the apparatus based on the communication date and time and the positional information acquired by the positional information acquisition unit.

7. The flow line management apparatus as claimed in claim 6, wherein
the flow line determining unit is configured to estimate a user who performs the operation corresponding to the operating content of the apparatus based on information including the migrating timing and the migrating position of the user.

8. The flow line management apparatus as claimed in claim 6, wherein
the flow line determining unit is configured to estimate a flow line starting time at which the user starts migrating when the user performs the operation corresponding to the operating content based on the migrating speed.

9. The flow line management apparatus as claimed in claim 5, wherein
the flow line determining unit is configured to determine a flow line of the user when the user operates the apparatus based on one of a transition in the positional information of the user from the flow line starting time to the operating date and time and a transition in the positional information from the operating date and time to a printed matter acquisition date and time.

10. The flow line management apparatus as claimed in claim 1, further comprising:
a screen generator configured to generate a screen for displaying the flow line when the user operates the apparatus determined by the flow line determining unit.

11. A flow line management system, comprising:
a wireless terminal; and
a flow line management apparatus configured to manage a flow line of the wireless terminal, wherein
the flow line management apparatus includes
a usage information acquisition unit configured to acquire operation information of an apparatus disposed at a predetermined position;
a positional information acquisition unit configured to acquire positional information of the wireless terminal held by a user operating the apparatus, the positional information having been transmitted to and received by the wireless terminal; and
a flow line determining unit configured to determine a flow line when the user operates the apparatus based on the operation information acquired by the usage information acquisition unit and the positional information acquired by the positional information acquisition unit.

12. The flow line management system as claimed in claim 11, wherein the apparatus includes at least one of:

a multifunctional peripheral; a bag; a table; a projector; a television conference terminal; a broom; a personal computer; a mobile phone; a facsimile machine; a scanner; a printer; a copier; an electronic white board; an air washer; a shredder; a gaming machine; a wheelchair; and a medical instrument.

13. The flow line management system as claimed in claim 11, further comprising:

a delivery apparatus configured to transmit the positional information to the wireless terminal; receive the positional information from the wireless terminal; and transmit the positional information to the flow line management apparatus.

14. The flow line management system as claimed in claim 11, wherein the wireless terminal is configured to receive the positional information from a delivery apparatus and transmit the positional information to the delivery apparatus.

15. The flow line management system as claimed in claim 13, wherein the delivery apparatus is powered by at least one of:

a lighting device;
an exhaust fan;
a wireless local area network access point;
a speaker;
a fire alarm;
a smoke detector;
a monitoring camera;
an air conditioner; and
a security sensor.

16. The flow line management system as claimed in claim 13, wherein the delivery apparatus is powered by an electronic apparatus configured to function in a manner other than that of the delivery apparatus.

17. The flow line management system as claimed in claim 13, wherein the delivery apparatus is powered by a lighting device.

18. The flow line management system as claimed in claim 17, wherein the apparatus is a multifunctional peripheral including at least copying and printing functions.

19. The flow line management system as claimed in claim 14, wherein the delivery apparatus includes a plurality of delivery apparatuses, a first of the plurality of delivery apparatuses is configured to transmit the positional information to the wireless terminal, and the wireless terminal is configured to transmit the positional information to a second of the plurality of delivery apparatuses.

20. A non-transitory computer-readable recording medium storing a flow line management program, which, when executed by a computer, causes a flow line management apparatus to implement a process, the process comprising:

acquiring operation information of an apparatus disposed at a predetermined position;

acquiring positional information of a wireless terminal held by a user operating the apparatus, the positional information having been transmitted to and received by the wireless terminal; and determining a flow line when the user operates the apparatus based on the acquired operation information and the acquired positional information.

* * * * *